United States Patent
Cohen et al.

(10) Patent No.: US 10,520,601 B2
(45) Date of Patent: Dec. 31, 2019

(54) METHODS AND SYSTEMS FOR DETECTING AT LEAST THE POSITION OF AN OBJECT IN SPACE

(71) Applicant: AUDIO PIXELS LTD., Rehovot (IL)

(72) Inventors: Yuval Cohen, Rehovot (IL); Daniel Lewin, Ramat Hasharon (IL); Eric Andreas Haber, Kibbutz Kfar Menahem (IL); Shay Kaplan, Givat Ela (IL); Meir Ben Simon, Givat Ela (IL)

(73) Assignee: AUDIO PIXELS LTD., Rehovot (IL)

( * ) Notice: Subject to any disclaimer, the term of this patent is extended or adjusted under 35 U.S.C. 154(b) by 0 days.

(21) Appl. No.: 15/566,105

(22) PCT Filed: Apr. 14, 2016

(86) PCT No.: PCT/IL2016/050400
§ 371 (c)(1),
(2) Date: Oct. 12, 2017

(87) PCT Pub. No.: WO2016/166763
PCT Pub. Date: Oct. 20, 2016

(65) Prior Publication Data
US 2018/0321381 A1    Nov. 8, 2018

Related U.S. Application Data

(60) Provisional application No. 62/147,710, filed on Apr. 15, 2015, provisional application No. 62/189,839, filed on Jul. 8, 2015.

(51) Int. Cl.
*H04R 1/00* (2006.01)
*G01S 7/521* (2006.01)
(Continued)

(52) U.S. Cl.
CPC .............. *G01S 15/931* (2013.01); *G01S 7/521* (2013.01); *G01S 15/42* (2013.01); *G01S 15/88* (2013.01);
(Continued)

(58) Field of Classification Search
CPC .......... G01S 7/521; G01S 15/42; G01S 15/88; G01S 15/93; H04R 1/00; H04R 1/40; H04R 3/00; H04R 19/02
(Continued)

(56) References Cited

U.S. PATENT DOCUMENTS 4,131,363 A    12/1978 Shea et al.
4,194,095 A    3/1980 Doi et al.
(Continued)

FOREIGN PATENT DOCUMENTS

EP    0437999 A2    7/1991
EP    1206160 A1    11/2000
(Continued)

OTHER PUBLICATIONS

Lagorce L. K. et al "Magnetic and Mechanical Properties of Micro-machined Strontium Ferrite/Polyimide Composites", IEEE Journal of Micro-electromechanical Systems, 6(4) Dec. 1997.
(Continued)

*Primary Examiner* — Tan Q Nguyen
(74) *Attorney, Agent, or Firm* — Browdy and Neimark, P.L.L.C.

(57) ABSTRACT

According to some embodiments there is provided a sound and detection system comprising at least a digital sound reconstruction speaker apparatus, comprising a plurality of pressure-pulse producing elements, and at least a controlling unit configured to control the actuation of the plurality of pressure-pulse producing elements, so as to produce at least an ultrasonic beam directed towards space during at least a
(Continued)

first time interval, for the calculation of at least the position of at least part of an object present in space based on the sensing of at least ultrasonic sound waves reflected by said part of the object, and control the actuation of the plurality of pressure-pulse producing elements, so as to produce audible content during at least a second time interval. Various other systems, methods and applications are described.

16 Claims, 16 Drawing Sheets

(51) Int. Cl.
G01S 15/42 (2006.01)
G01S 15/88 (2006.01)
G06F 3/01 (2006.01)
H04R 1/40 (2006.01)
H04R 19/02 (2006.01)

(52) U.S. Cl.
CPC .............. *G06F 3/017* (2013.01); *H04R 1/005* (2013.01); *H04R 1/403* (2013.01); *G01S 2015/932* (2013.01); *H04R 19/02* (2013.01)

(58) Field of Classification Search
USPC ......................................................... 701/301
See application file for complete search history.

(56) References Cited

U.S. PATENT DOCUMENTS

| | | | |
|---|---|---|---|
| 4,337,379 A | 6/1982 | Nakaya | |
| 4,515,997 A | 5/1985 | Stinger, Jr. | |
| 5,517,570 A | 5/1996 | Taylor | |
| 5,574,792 A | 11/1996 | Konno | |
| 5,580,639 A | 12/1996 | Togawa et al. | |
| 5,953,200 A | 9/1999 | Haley et al. | |
| 5,954,360 A * | 9/1999 | Griggs ................... | B60N 2/002 |
| | | | 180/268 |
| 6,094,116 A | 7/2000 | Tai et al. | |
| 6,125,189 A | 9/2000 | Yasuno et al. | |
| 6,243,323 B1 * | 6/2001 | Li .......................... | G01S 15/102 |
| | | | 367/138 |
| 6,289,106 B1 | 9/2001 | Wong | |
| 6,373,955 B1 | 4/2002 | Hooley | |
| 6,403,995 B2 | 6/2002 | Thomas | |
| 6,795,561 B1 | 9/2004 | Bank | |
| 6,959,096 B2 | 10/2005 | De Vries et al. | |
| 6,963,654 B2 | 11/2005 | Sotme et al. | |
| 6,975,740 B2 | 12/2005 | Rautio et al. | |
| 7,016,186 B2 | 3/2006 | Ueda et al. | |
| 7,286,681 B2 | 10/2007 | Gerkinsmeyer | |
| 7,669,478 B2 * | 3/2010 | Su ......................... | G01N 29/245 |
| | | | 73/632 |
| 7,679,527 B2 | 3/2010 | Roland et al. | |
| 8,780,673 B2 | 7/2014 | Cohen et al. | |
| 9,475,438 B2 * | 10/2016 | Breed ...................... | B60N 2/24 |
| 9,638,297 B2 | 5/2017 | Son et al. | |
| 9,820,076 B2 * | 11/2017 | Guo ........................ | H04S 7/302 |
| 2001/0048123 A1 | 12/2001 | Thomas | |
| 2002/0073856 A1 | 6/2002 | Davis et al. | |
| 2002/0106093 A1 | 8/2002 | Azima et al. | |
| 2002/0151171 A1 | 10/2002 | Furusawa | |
| 2003/0068054 A1 | 4/2003 | Sotme et al. | |
| 2003/0129814 A1 | 4/2003 | Mizukoshi | |
| 2004/0122543 A1 | 6/2004 | Lee et al. | |
| 2004/0202049 A1 * | 10/2004 | Breed .................. | B06B 1/0215 |
| | | | 367/138 |
| 2005/0008171 A1 | 1/2005 | Hosoi et al. | |
| 2005/0207588 A1 | 9/2005 | Biegelsen | |
| 2006/0145059 A1 | 7/2006 | Lee et al. | |
| 2008/0232608 A1 | 9/2008 | Ullmann | |
| 2009/0316529 A1 | 12/2009 | Huuskonen et al. | |

| | | | |
|---|---|---|---|
| 2013/0058497 A1 * | 3/2013 | Okamura ............... | H04R 1/005 |
| | | | 381/94.1 |
| 2013/0148827 A1 | 6/2013 | Cohen | |
| 2013/0315034 A1 * | 11/2013 | Yagihashi ............... | H04R 1/32 |
| | | | 367/103 |

FOREIGN PATENT DOCUMENTS

| | | |
|---|---|---|
| EP | 1063866 A1 | 12/2000 |
| EP | 1065725 A2 | 1/2001 |
| EP | 1465211 A2 | 10/2004 |
| EP | 1653614 A1 | 5/2006 |
| EP | 2187657 A | 5/2010 |
| EP | 2672727 A | 12/2013 |
| GB | 2106750 A | 4/1983 |
| GB | 2393601 A | 3/2004 |
| JP | 51120710 A2 | 10/1976 |
| JP | 57023387 A | 2/1982 |
| JP | 57185790 A2 | 11/1982 |
| JP | 05014992 | 1/1993 |
| JP | 09266599 A | 7/1997 |
| JP | 09098092 A2 | 8/1997 |
| JP | 2001016675 A | 1/2001 |
| JP | 2005087929 A | 4/2005 |
| JP | 2012/029093 A | 2/2012 |
| NL | 6613713 A | 4/1968 |
| WO | 8400460 A1 | 2/1984 |
| WO | 9631086 A1 | 3/1996 |
| WO | 9824544 A1 | 6/1998 |
| WO | 0123104 A2 | 4/2001 |
| WO | 0187458 A1 | 11/2001 |
| WO | 0217127 A2 | 2/2002 |
| WO | 03017717 A2 | 2/2003 |
| WO | 03059005 A2 | 7/2003 |
| WO | 2007/135678 A2 | 11/2007 |
| WO | 2007135680 A1 | 11/2007 |
| WO | 2009066290 A2 | 5/2009 |
| WO | 11111042 A1 | 9/2011 |
| WO | 2012070042 A1 | 5/2012 |

OTHER PUBLICATIONS

Lagorce L. K. et al "Magnetic micro actuators based on polymer magnets", IEEE Journal of Micro-electromechanical Systems, 8(1), Mar. 1999.
BBE's DS48 "Digital Speaker Processor" Digital Loudspeaker Management System (Mar. 2006).
Diamond A M et al. "Digital sound reconstruction using arrays of cmos-mems microspeakers", Transducers, Solid-State Sensors, Actuators and Microsystems, 12th International Conference on, 2003, Piscataway, NJ, US, IEEE, (1) 238-241 (Jun. 9, 2003).
Yamaha "Why have multiple speakers when one unit will do" Multi-Channel Surround Sound From a Single Compenent YSP 1000 (2004).
Hawksford M O J "Smart Digital Loudspeaker Arrays", Journal of the Audio Engineering Society, New York, NY, US, 51 (12) 1133-1162. (Dec. 2003).
Huang Y et al: "Distortion and Directivity in a Digital Transducer Array Loudspeaker" , Journal of the Audio Engineering Society, 49 (5) 337-352, XP001178706, ISSN: 1549-4950 (May 2001).
Meyer D G: "Digital Control of Loudspeaker Array Directivity", Journal of the Audio Engineering Society, New York, NY, US, vol. 32,(10) 747-754, XP000763026, ISSN: 1549-4950 (Oct. 1984).
Crocker "Encyclopedia of Acoustics" Wiley-Interscience; vol. 1 : 1-5 (Apr. 22, 1997).
Kinsler et al "Fundamentals of Acoustics" Wiley-Interscience; (4) 1-9 (2000).
Raichel "The Science and Applications of Acoustics" Springer. (2) 1-4 (2006).
Rossing et al "Principles of Vibration and Sound" Springer-Verlag. 1-4 (2004).
Fahy "Foundations of Engineering Acoustics" 1-9 (Oct. 2003).
Neumann et al "MEMS (Microelctromechanical Systems) Audio Devices-Dreams and Realities". 1-5 (Oct. 2003).

(56) References Cited

OTHER PUBLICATIONS

Braun et al "Row/Column Addressing Scheme for Large Electrostatic Actuator MEMS Switch Arrays and Optimization of the Operational Reliability by Statistical Analysis" Journal of Microelectromechanical Systems. 17 (5) (Oct. 2008).
Schreier et al "Understanding Delta-Sigma Data Converters" Wiley-Interscience. IEEE Press 1-455 (2005).
Hawksford, "Spatial Distribution of Distortion and Spectrally Shaped Quantization Noise in Digital Micro-Array Loudspeakers" J. Audio Eng. Soc. 55 : 1/2 : 1-26 (2007).

\* cited by examiner (A) Emission of sound waves comprising audible content
(B) Emission of ultrasonic sound waves for object detection

METHODS AND SYSTEMS FOR DETECTING AT LEAST THE POSITION OF AN OBJECT IN SPACE

TECHNICAL FIELD

The presently disclosed subject matter relates to the detection of a least the position of an object in space.

BACKGROUND

In the prior art, the detection of at least the position of an object in space can be performed by dedicated systems such as radars or ultrasound systems.

This detection can be used for various applications such as touch-less gesture recognition (such as in U.S. Pat. No. 9,638,297), or automated car parking (such as in U.S. Pat. No. 7,679,527).

There is a need to propose new methods and systems for detecting an object.

GENERAL DESCRIPTION

In accordance with certain aspects of the presently disclosed subject matter, there is provided a sound and detection system comprising at least a digital sound reconstruction speaker apparatus, comprising a plurality of pressure-pulse producing elements, and at least a controlling unit configured to control the actuation of the plurality of pressure-pulse producing elements, so as to produce at least an ultrasonic beam directed towards space during at least a first time interval, for the calculation of at least the position of at least part of an object present in space based on the sensing of at least ultrasonic sound waves reflected by said part of the object, and control the actuation of the plurality of pressure-pulse producing elements, so as to produce audible content during at least a second time interval.

According to some embodiments, the sound and detection system comprises at least a sensor configured to sense the said reflected ultrasonic sound waves. According to some embodiments, said at least sensor and the digital sound reconstruction speaker apparatus are located in the same package. According to some embodiments, said at least sensor and the digital sound reconstruction speaker apparatus are a part of the same chip. According to some embodiments, the controlling unit is configured to control the actuation of the plurality of pressure-pulse producing elements so as to produce at least an ultrasonic beam whose direction and/or shape varies in time, in order to scan at least part of said space. According to some embodiments, the controlling unit is configured to control the actuation of the plurality of pressure-pulse producing elements so as to alternate between the production of at least an ultrasonic beam during a first subset of time intervals and the production of audible content during a second subset of time intervals, wherein the breaks in the audible content produced by the digital sound reconstruction speaker apparatus during the second subset of time intervals do not produce unwanted audible distortion to the audible content. According to some embodiments, the controlling unit is configured to control the actuation of the plurality of pressure-pulse producing elements so as to alternate between the production of at least an ultrasonic beam during a first subset of time intervals and the production of audible content during a second subset of time intervals, wherein the breaks in the audible content produced by the digital sound reconstruction speaker apparatus during the second subset of time intervals do not produce audible distortion to the audible content. According to some embodiments, the controlling unit is configured to determine at least one of the dimensions, the distance, the form, the direction, data representing the motion, and sound reflecting properties of at least part of the object based at least on the sensing of the said reflected ultrasonic sound waves. According to some embodiments, the system is further configured to code the ultrasonic beam emitted towards space. According to some embodiments, the system is further configured to calculate at least the position of at least part of an object located behind an obstacle and/or in an environment with any level of visibility. According to some embodiments, the system comprises a plurality of sound digital sound reconstruction speaker apparatus.

It is to be noted that the previous embodiments can be combined in any of their possible technical combination.

In accordance with some aspects of the presently disclosed subject matter, there is provided a motion sensor comprising a sound and detection system according to any of the embodiments described previously, wherein the motion sensor is configured to detect a motion of at least part of an object in space.

In accordance with some aspects of the presently disclosed subject matter, there is provided a camera comprising a sound and detection system according to any of the embodiments described previously, said camera comprising a display representing objects detected in the space by said sound and detection system.

According to some embodiments, the camera is configured to display at least one of the dimensions, the distance, the form, the direction, data representing the motion, and the sound reflecting properties of at least part of said objects.

In accordance with some aspects of the presently disclosed subject matter, there is provided an audio sound system comprising a sound and detection system according to any of the embodiments described previously, wherein the audio sound system is configured to detect at least the position of at least part of an object present in a space surrounding said audio sound system, for controlling the audible content produced by said audio sound system.

According to some embodiments, the audio sound system is configured to identify at least a listener present in at least part of the space surrounding said audio sound system.

According to some embodiments, the controlling of the audible content comprises the controlling of the directivity of the audible content produced by the at least digital sound reconstruction speaker reconstruction apparatus.

According to some embodiments, the audio sound system is configured to perform active noise cancellation based on the detection of at least the position of at least an object present in at least part of the space surrounding said audio sound system.

In accordance with some aspects of the presently disclosed subject matter, there is provided a gesture detection system comprising a sound and detection system according to any of the embodiments described previously, wherein the gesture detection system is configured to detect at least a gesture performed by at least a part of a body.

According to some embodiments, the gesture detection system further comprises a memory storing definitions of gestures, wherein the gesture detection system is configured to detect a motion of said part of the body and identify the gesture performed by said part of the body based on the comparison of the detected motion with said definitions.

In accordance with some aspects of the presently disclosed subject matter, there is provided a system for vehicle parking assistance comprising a sound and detection system according to any of the embodiments described previously, wherein the system for parking assistance is configured to detect at least the position of at least an object present around said vehicle, for assisting the parking of said vehicle.

According to some embodiments, the at least digital sound reconstruction speaker of the sound and detection system is configured to produce at least an audible message in a space surrounding the vehicle, based on the detection of the position of at least an object present around said vehicle.

In accordance with some aspects of the presently disclosed subject matter, there is provided a method comprising, by a controlling unit, controlling the actuation of the plurality of pressure-pulse producing elements of at least a digital sound reconstruction speaker apparatus, so as to produce at least an ultrasonic beam directed towards space during at least a first time interval, for the calculation of at least the position of at least part of an object present in space based on the sensing of at least ultrasonic sound waves reflected by said part of the object, and controlling the actuation of the plurality of pressure-pulse producing elements, so as to produce audible content during at least a second time interval.

According to some embodiments, the controlling unit controls the actuation of the plurality of pressure-pulse producing elements so as to produce at least an ultrasonic beam whose direction and/or shape varies in time, in order to scan at least part of said space.

According to some embodiments, the controlling unit controls the actuation of the plurality of pressure-pulse producing elements so as to alternate between the production of at least an ultrasonic beam during a first subset of time intervals and the production of audible content during a second subset of time intervals, wherein the breaks in the audible content produced by the digital sound reconstruction speaker apparatus during the second subset of time intervals do not produce unwanted audible distortion to the audible content.

According to some embodiments, the controlling unit controls the actuation of the plurality of pressure-pulse producing elements so as to alternate between the production of at least an ultrasonic beam during a first subset of time intervals and the production of audible content during a second subset of time intervals, wherein the breaks in the audible content produced by the digital sound reconstruction speaker apparatus during the second subset of time intervals do not produce audible distortion to the audible content.

According to some embodiments, the method further comprises determining at least one of the dimensions, the distance, the form, the direction, data representing the motion and sound reflecting properties of at least part of the object based at least on the sensing of the said reflected ultrasonic sound waves.

According to some embodiments, the method comprises coding the ultrasonic beam sent towards space.

According to some embodiments, the method comprises controlling the audible content produced by the at least digital sound reconstruction speaker reconstruction apparatus based at least on the detection of at least the position of at least part of an object present in a space surrounding said at least digital sound reconstruction speaker apparatus.

According to some embodiments, the method comprises detecting at least the position of at least an object present around a vehicle on which the at least digital sound reconstruction speaker apparatus is located, for assisting the parking of said vehicle.

According to some embodiments, the method comprises the step of producing, by the at least digital sound reconstruction speaker of the sound and detection system, at least an audible message in a space surrounding the vehicle, based on the detection of the position of at least an object present around said vehicle.

According to some embodiments, the method comprises detecting a gesture performed by at least a part of a body.

In accordance with some aspects of the presently disclosed subject matter, there is provided a non-transitory storage device readable by a processing unit, tangibly embodying a program of instructions executable by the processing unit to perform the method according to one or more of the embodiments previously described.

According to some embodiments, the solution proposes a system which can be both used for the production of audible content and the detection of various data of a least part of an object, such as its position. In particular, according to some embodiments, it is possible, with the same components of the system, to detect at least the position of an object and to produce audible content. This avoids the need of adding new components for performing said functions.

According to some embodiments, the solution proposes a system which does not need the installation of dedicated emitters, such as ultrasound transducers.

According to some embodiments, the solution proposes a system which allows the control of the sensing direction for which it is desired to detect the position of objects.

According to some embodiments, the solution proposes a system which allows the scan of a space, to detect the position of at least part of an object present in said space.

According to some embodiments, the solution proposes a system which allows the scan of a least part of an object.

According to some embodiments, the solution proposes a system which allows the scan of a least part of an object without physically moving the position or direction of the emitter.

According to some embodiments, the solution proposes a system which allows the determination of various characteristics of the object, such as the dimensions, the distance, the form, the direction, data representing the motion, and sound reflecting properties of at least part of the object.

According to some embodiments, the solution proposes a system which allows identifying a gesture of a least part of a human body.

According to some embodiments, the solution proposes a system which allows efficient detection of a gesture made by a human for controlling various devices.

According to some embodiments, the solution proposes a system which allows tracking at least part of an object.

According to some embodiments, the solution proposes a system which allows an area mapping for controlling the sound of an audio sound system.

According to some embodiments, the solution proposes a system which allows efficient assistance for parking of a vehicle.

According to some embodiments, the solution proposes a system which allows the detection of at least the position of an object located in a low visibility environment, and/or located behind an obstacle.

According to some embodiments, the solution can further provide a visualization of said object and a display of data of said object.

According to some embodiments, the solution provides a motion sensor.

BRIEF DESCRIPTION OF THE DRAWINGS

In order to understand the invention and to see how it can be carried out in practice, embodiments will be described, by way of non-limiting embodiments, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "controlling", "detecting", "determining", "sensing", "identifying" or the like, refer to the action(s) and/or process(es) of a processing unit that manipulate and/or transform data into other data, said data represented as physical, such as electronic, quantities and/or said data representing the physical objects.

The term "processing unit" covers any computing unit or electronic unit that may perform tasks based on instructions stored in a memory, such as a computer, a server, a chip, etc. It can encompass a single processor or multiple processors, which may be located in the same geographical zone or may, at least partially, be located in different zones and may be able to communicate together.

The term "non-transitory memory" as used herein should be expansively construed to cover any volatile or non-volatile computer memory suitable to the presently disclosed subject matter.

The term "digital speaker" refers in the present specification to a digital sound reconstruction speaker.

Embodiments of the presently disclosed subject matter are not described with reference to any particular programming language. It will be appreciated that a variety of programming languages may be used to implement the teachings of the presently disclosed subject matter as described herein.

Figure 1:
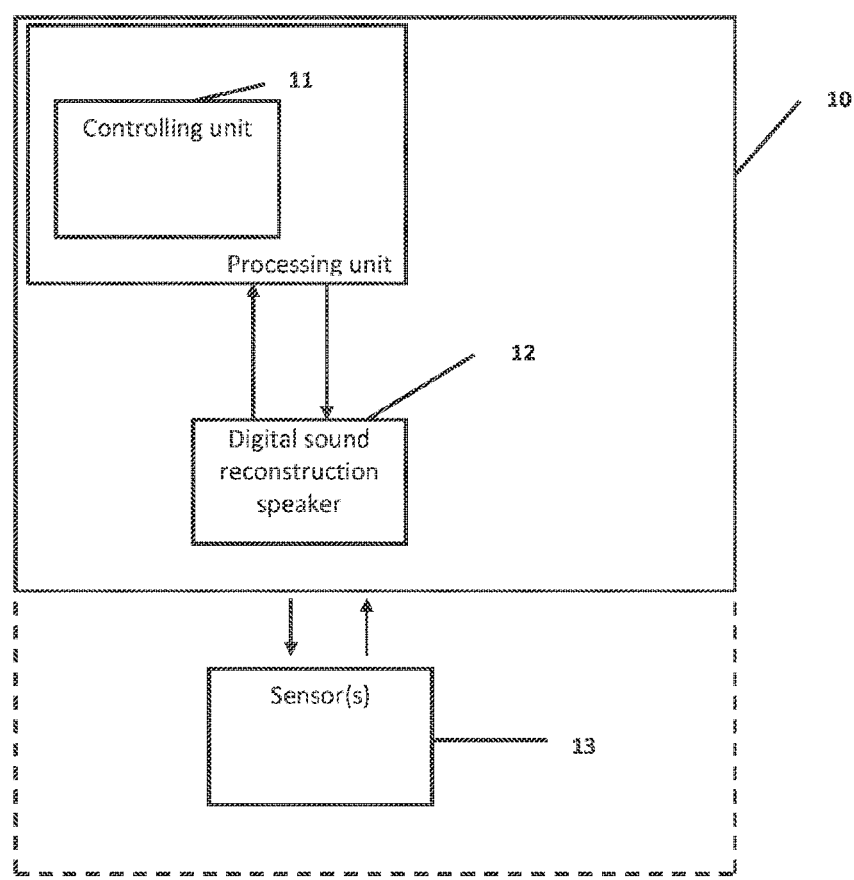
FIG. 1 illustrates an embodiment of a sound and detection system.

FIG. 1 illustrates an embodiment of a sound and detection system 10. As explained in the specification, according to some embodiments, the system 10 can in particular produce audible content, and detect at least the position of at least part of an object in space.

In the present description, the term "object" includes any physical object which has at least a part which can reflect ultrasonic sound waves. The "object" can include inert objects and/or living objects (such as humans, animals, etc.).

The system 10 comprises at least a controlling unit 11 operating on a processing unit. The controlling unit 11 can perform various tasks and steps which will be described later in the specification. Although the system 10 was depicted as comprising a controlling unit operable on a processing unit, according to some embodiments the processing unit runs said different tasks and steps or at least part of them.

According to some embodiments, the system 10 comprises a plurality of controlling units 11, which can be located in the same processing unit or in different processing units (the processing units can be located in different physical locations). According to some embodiments, a plurality of controlling units is used, each controlling unit controlling specific tasks of the system. According to some embodiments, the controlling units can communicate between themselves through any adapted communication channel.

The system 10 further comprises at least a digital sound reconstruction speaker apparatus 12. The digital sound reconstruction speaker apparatus comprises a plurality of pressure-pulse producing elements. This allows the digital sound reconstruction speaker to produce sound waves.

According to some embodiments, the system 10 comprises a plurality of digital sound reconstruction speaker apparatus. If a plurality of digital sound reconstruction speaker apparatus 12 is used, these digital sound reconstruction speaker apparatus 12 are not necessarily located in the same physical location, and at least a subset of the digital sound reconstruction speaker apparatus can be located away from the other digital sound reconstruction speaker apparatus.

According to some embodiments a first subset of the digital sound reconstruction speaker apparatus is located in a first package, a second subset of the digital sound reconstruction speaker apparatus is located in a second package, etc. The different packages can be located in different physical locations. A common controlling unit or a plurality of controlling units can be used to control each digital sound reconstruction speaker apparatus.

Although the controlling unit 11 and the digital sound reconstruction speaker apparatus 12 are represented in FIG. 1 in the same assembly 10, it is to be noted that the controlling unit 11 and the digital sound reconstruction speaker apparatus 12 are not necessarily located in the same physical location, and are not necessarily located in the same package.

As illustrated, the controlling unit 11 can communicate with the digital sound reconstruction speaker apparatus 12, for example through at least a wired connection. In particular, the controlling unit 11 can control the operation of the digital sound reconstruction speaker apparatus.

Non limiting embodiments for this digital sound reconstruction speaker apparatus will be described with reference to FIGS. 2 and 4.

The system 10 further comprise at least a sensor 13 configured to sense ultrasonic sound waves. Ultrasonic sound waves include sound waves whose frequency is higher than 30 KHz.

According to some embodiments, the system 10 comprises a plurality of sensors 13. For example, the sensors can be located at different physical locations.

According to some embodiments, at least a sensor is associated to each digital sound reconstruction speaker apparatus of the system 10, in order to sense the reflection of the ultrasonic sound waves sent by said digital sound reconstruction speaker apparatus towards the space and reflected by at least part of an object.

According to some embodiments, the sensor 13 can be a dedicated sensor which senses only ultrasonic sound waves.

According to some embodiments, the sensor 13 can also be a sound sensor which can sense both ultrasonic sound waves and other sound waves. In this case, a post-processing of the sensed data (which can be performed in the sensor or by an external processing unit) can be performed to filter the sensed data and obtain only the ultrasonic components.

The sensor 13 can be part of the system 10 or can be external to the system 10.

According to some embodiments, the sensor 13 and the digital sound reconstruction speaker 12 are in the same package. According to some embodiments, the sensor 13 and the digital sound reconstruction speaker 12 are not in the same package.

According to some embodiments, the sensor 13 is a part of the chip of the digital sound reconstruction speaker 12. According to other embodiments, the sensor 13 is located on a chip which is different from the chip of the digital sound reconstruction speaker 12.

According to some embodiments, the sensor 13 can exchange data with the controlling unit 11 and/or with the digital sound reconstruction speaker 12, through a wired connection or a wireless connection.

According to some embodiments, at least part of the components of the system 10 is located into a unique package.

According to some embodiments, the system 10 further comprises a non-transitory memory for storing data (not represented), which can communicate with the controlling unit.

According to some embodiments, the system 10 can comprise an acoustic window that is transparent to ultrasonic sound waves. The acoustic window can also be made such that it does not let particles (typically small particles) that may harm the components of the system, such as the sensor 13 or digital sound reconstruction speaker apparatus 12, enter the package.

According to some embodiments, the system 10 can comprise an amplifier (not represented) which is connected to the sensor 13. The ultrasonic sound waves sensed by the sensor 13 can be sent to the amplifier which allows the amplification of the signal for further processing by a controlling unit, for detection of at least the position of at least part of an object in space.

According to some embodiments, the system 10 comprises a display unit (not represented, such as a screen) so as to display results and/or indications on the calculated data and/or to allow a user to enter data through an adapted interface which is displayed on the display unit.

For example, the system 10 can display the location or other parameters of the object that were calculated (e.g. size, form, etc.).

Figure 2:
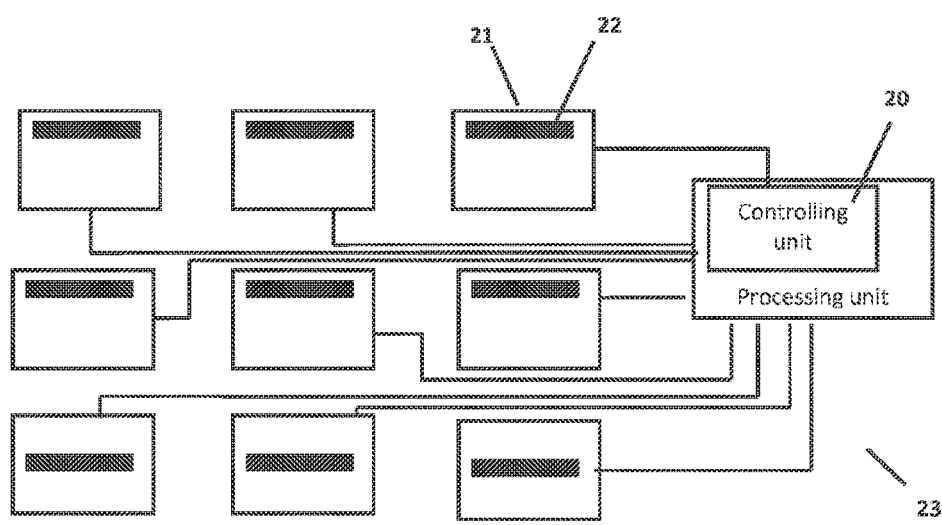
FIG. 2 illustrates an embodiment of a digital sound reconstruction speaker which can be part of the system of FIG. 1.

FIG. 2 illustrates an embodiment of a digital sound reconstruction speaker apparatus 23 which can be part of the system 10 of FIG. 1. The representation of FIG. 2 is a simplified representation and different configurations can be used.

As shown, the digital sound reconstruction speaker apparatus 23 comprises an array of pressure-pulse producing elements 21. Each pressure-pulse producing element 21 comprises at least a moving element 22, which can be constrained to move along at least an axis in response to a force such as an electrostatic force and/or piezoelectric force.

A controlling unit 20, which is operable on a processing unit, computes the signals which are to be applied to the array of moving elements in order to control their motion and thus produce a sound wave. The controlling unit 20 can be the same as the controlling unit 11 or can be a different controlling unit.

In a particular embodiment, the digital sound reconstruction speaker apparatus comprises 1024 pressure-pulse producing elements which can be located on a matrix of 32 pressure-pulse producing elements by 32 pressure-pulse producing elements each have a total travel in the order of 6 microns.

Figure 3:
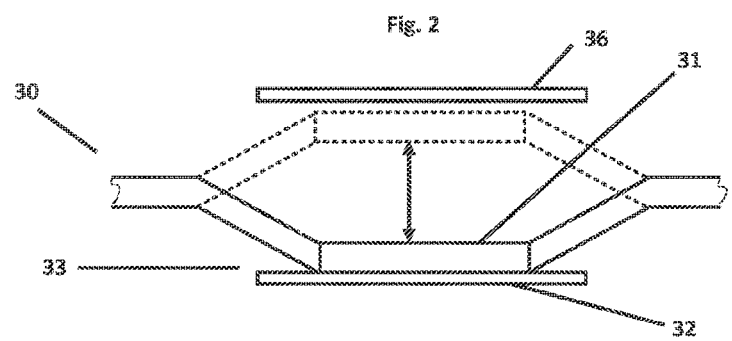
FIG. 3 illustrates an embodiment of a pressure-pulse producing element of a digital sound speaker.

As shown in FIG. 3, each pressure-pulse producing element 30 generally comprises at least a moving element 31, a first electrode 32 (bottom electrode) and a second electrode 36 (upper electrode).

According to some embodiments, the controlling unit 20 is configured to apply voltages (through e.g. switching mechanisms) between the moving element 31 and the electrodes 32, 36. The application of a different voltage between the moving element 31 and the electrodes 32, 36 induces an electrostatic force, which provokes the translation of the moving element along an axis.

According to some embodiments, the moving element 31 can be latched in at least one of its extreme positions on the axis along which it is moving, which is either a position adjacent to the bottom electrode or a position adjacent to the upper electrode.

Figure 4:
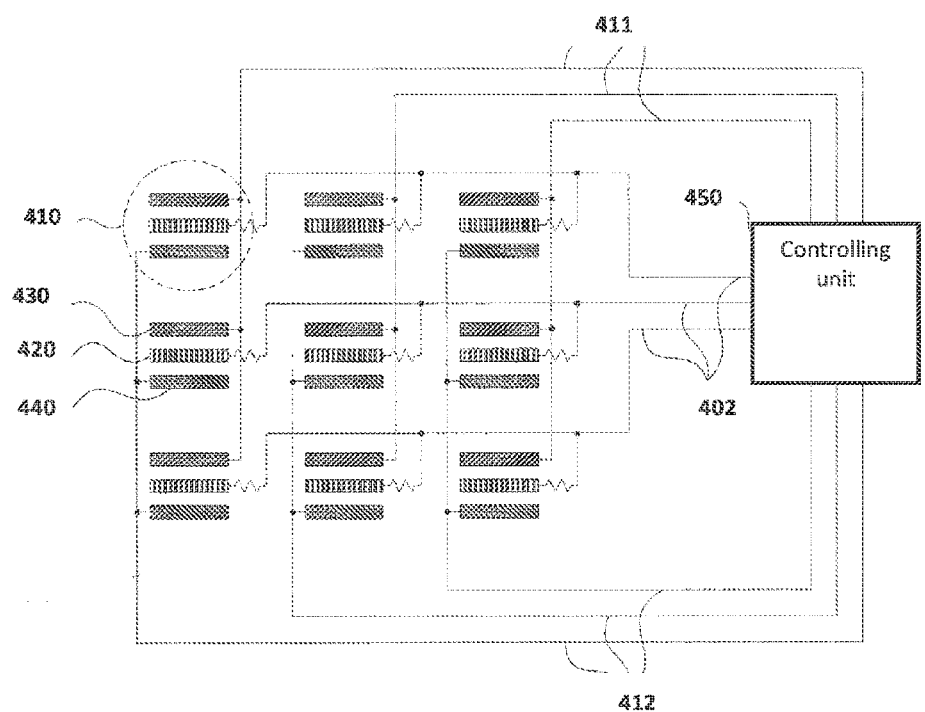
FIG. 4 illustrates an embodiment of an array comprising a plurality of pressure-pulse producing elements.

According to some embodiments, and as described in the non limiting embodiment of FIG. 4, the controlling unit can address groups of electrodes and of moving elements.

In this embodiment, the pressure-pulse producing elements 410 (comprising moving elements 420 and electrodes 430, 440) are partitioned into different subsets.

The upper electrodes 430 belonging to the pressure-pulse producing elements 410 of the same column are connected to the controlling unit 450 with the same wire 411.

The lower electrodes 440 belonging to the pressure-pulse producing elements 410 of the same column are connected to the controlling unit 450 with the same wire 412.

The moving elements 420 belonging to the pressure-pulse producing elements 410 of the same line are connected to the controlling unit 450 with the same wire 402.

Further embodiments and variations of such a digital sound reconstruction speaker apparatus are described in patent application WO 2012/070042 of the Applicant, which is hereby incorporated by reference in its entirety.

Figure 5:
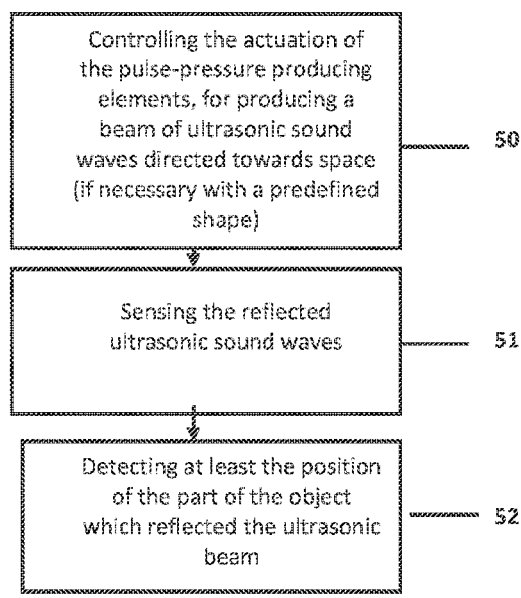
FIG. 5 illustrates an embodiment of a method of detecting at least the position of an object in space.

Referring now to FIG. 5, an embodiment of a method comprising the detection of at least the position of at least part of an object in space is described, which can comprise the use of e.g. the sound and detection system 10.

As illustrated, the method can comprise a step 50 of controlling the actuation of a plurality of pressure-pulse producing elements of at least a digital sound reconstruction speaker apparatus, so as to produce at least an ultrasonic beam directed towards space.

According to some embodiments, the ultrasonic beam is controlled so as to obtain a desired directivity. The "directivity" or "directivity pattern" includes the pattern of the spatial distribution of the acoustic energy generated by the digital sound reconstruction speaker apparatus. According to some embodiments, the shape of the ultrasonic beam is controlled. Embodiments for controlling the directivity and shape of the ultrasonic beam in space will be described later in the specification.

The control performed at step 50 can comprise determining which moving elements of the array of the digital sound reconstruction speaker to move during a control cycle, in order to create a wave with desired parameters (such as frequency, amplitude, shape, direction, etc.), and sending the corresponding signal to the pressure-pulse producing elements by the controlling unit.

As mentioned, in step 50, this control is performed so as to obtain ultrasonic sound waves.

The control performed at step 50 can be performed by the controlling unit of the sound and detection system 10 (such as controlling unit 11 of FIG. 1), and/or by a controlling unit of the digital sound reconstruction speaker apparatus (such as controlling unit 20 of FIG. 2). This control can also be performed by a single controlling unit. According to some embodiments, this control is performed by an external controlling unit, for example of a device which comprises the sound and detection system.

The ultrasonic sound waves, produced at step 50, are sent and directed towards at least a direction of the space facing the digital sound reconstruction speaker apparatus.

If at least part of an object is present on the path of the ultrasonic beam, said part can reflect (at least part) of the ultrasonic beam.

The method can comprise a step 51 of sensing the ultrasonic sound waves reflected by the part of the object.

The method can comprise a step 52 of detecting/calculating at least the position at which the ultrasonic beam was reflected. This position corresponds to the position of the part of the object which reflected the ultrasonic beam.

The method can comprise calculating various parameters of at least part of the object, such as (but not limited to) the position, velocity, acceleration, direction, or physical parameters of at least part of the object such as (but not limited to) its size, its dimensions, its form, etc. The method can also comprise determining sound reflecting properties of at least part of the object.

The method can also comprise locating and/or tracking the object. The method can also comprise performing range finding of at least part of the object. Other parameters can be calculated depending on the needs.

The sensing 51 of the reflected ultrasonic sound waves can be performed by the at least sensor 13 of FIG. 1. As mentioned with respect to FIG. 1, the ultrasonic sound waves sensed by the sensor 13 can be amplified. The ultrasonic sound waves sensed by the sensor (and if necessary, after their amplification) are sent to a controlling unit (such as the controlling unit 11 of the system 10) or to another processor-based controlling unit for further processing. This other processor-based controlling unit can be a remote controlling unit which communicates with the system 10 through any adapted wired or unwired connection.

The method can further comprise a step (not represented) of outputting the data that were calculated, such as the position of the object or its form. These data can be e.g. displayed on a screen.

Figure 6:
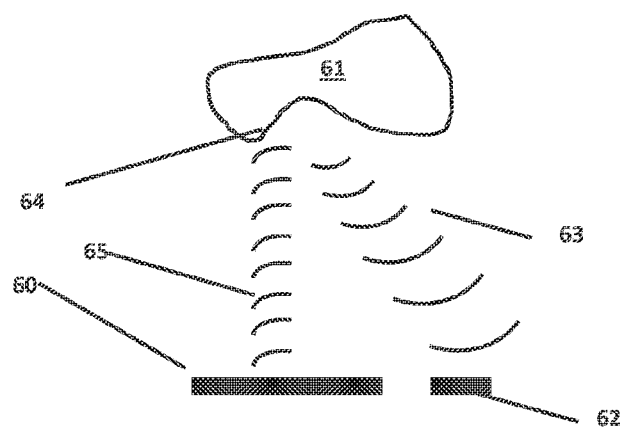
FIG. 6 illustrates an embodiment of a system for detecting at least the position of an object in space.

FIG. 6 shows an embodiment for the method of FIG. 5, wherein a digital sound reconstruction speaker apparatus 60 sends an ultrasonic beam 65 with a controlled directivity towards space. A sensor 62 senses the ultrasonic waves 63 reflected by the reflecting surface 64 of an object 61.

According to some embodiments, the controlling unit can use the timing, and/or the amplitude, and/or the phase of the sensed reflected signal together with known parameters of the ultrasonic beam which was emitted by the digital sound speaker, in order to detect at least the position of at least part of an object and calculate various data on the object. In particular, the controlling unit can calculate at what position (and possibly at what time) the reflection of the ultrasound beam was made on the part of the object.

The known parameters of the emitted ultrasonic beam can include: time of emission of the ultrasonic beam, direction, shape, spectral content, amplitude, coding (as explained later in the specification), etc. These known parameters can be calculated or determined by the controlling unit of the digital sound reconstruction speaker apparatus, since said controlling unit controls the emission of the ultrasonic beam. The known parameters can also include the location of previous reflections (which were calculated in previous steps).

The data that can be calculated by the controlling unit based on the reflected ultrasonic waves can include e.g. at least one of the position of the object (and thus its relative distance), the dimensions of the object (such as its size, or the form of the object), data representing the motion of the object (such as the evolution of the position, the velocity or the acceleration), sound reflecting properties of the object and properties that affect the reflectance of ultrasound such as roughness, porosity, hardness.

The data representing the motion of the object can be computed for example if ultrasonic sound waves are repeatedly sent towards the object.

According to some embodiments, in order to calculate these data, the controlling unit can correlate the reflected ultrasonic waves with the emitted ultrasonic beam.

According to some embodiments, the controlling unit uses a known per se algorithm. According to some embodiments, the controlling unit calculates the difference between the time of sensing of the reflected ultrasonic waves and the time at which the ultrasonic beam was emitted. By multiplying this difference with the speed of sound in air, the controlling unit can calculate the position at which the reflection took place (in addition the controlling unit knows the direction of the ultrasonic beam which was emitted by the sound and detection system).

Since the position of the reflecting surface is known during time, the velocity and acceleration can be calculated.

The position of the reflecting surface can also provide information on the form and dimensions of the object.

The sound reflecting properties of the object can be calculated according to some embodiments by comparing the amplitude of the sensed ultrasonic beam with the amplitude of the emitted ultrasonic beam. Objects which have low sound reflecting properties will induce the production of reflected ultrasonic waves with reduced amplitude with respect to the amplitude of the ultrasonic beam before the reflection.

According to some embodiments, three dimensional information can be obtained on an object with a single digital sound reconstruction speaker apparatus and a single sensor. Indeed, parts of the object which are not facing the ultrasonic beam can be reached by the reflection of the ultrasonic beam on at least a reflector surrounding the object, for example on walls present around the object.

If a plurality of ultrasonic sensors and/or digital sound reconstruction speaker apparatus is used, the resolution can be increased. In addition, the three dimensional data content is increased. If several digital sound reconstruction speaker apparatus are used (and if needed, several sensors are configured to detect ultrasonic sound waves), ultrasonic sound waves can be sent towards the object from various points and/or various directions.

According to some embodiments, coding of the emitted ultrasonic beam can improve the determination of the location of the reflecting surface of the object.

Indeed, this coding can make it easier to discriminate between the primary reflection on the object and secondary reflections.

Indeed, secondary reflections from previous timing can reach the sensor at the same timing as the primary reflections, which makes it more difficult to discriminate between the reflections.

As a consequence, the controlling unit can more easily detect the object and calculate its position or other parameters of the object.

Coding of the emitted ultrasonic beam can be realized by using frequency chirp, pulse coding or any other method known in the art.

Figure 7:
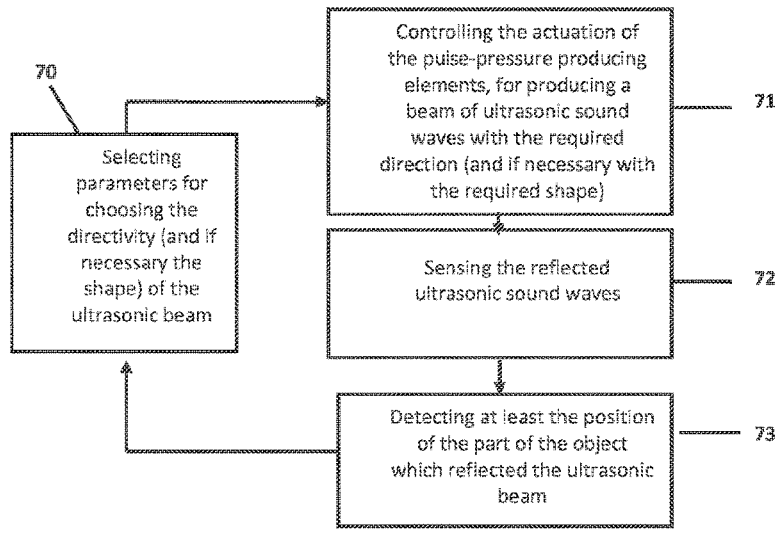
FIG. 7 illustrates another embodiment of a method of detecting at least the position of an object in space.

FIG. 7 illustrates another embodiment of a method which comprises the detection of at least the position of at least part of an object in space.

The method of FIG. 7 is similar to the method of FIG. 5 but is iterative, and can allow for example scanning the space with the ultrasonic beam in order to scan the objects present in the space.

Step 71 is similar to step 50 and comprises controlling the actuation of a plurality of pressure-pulse producing elements of at least a digital sound reconstruction speaker apparatus, so as to produce at least an ultrasonic beam towards the space, wherein said ultrasonic beam has a predefined directivity.

Figure 12:
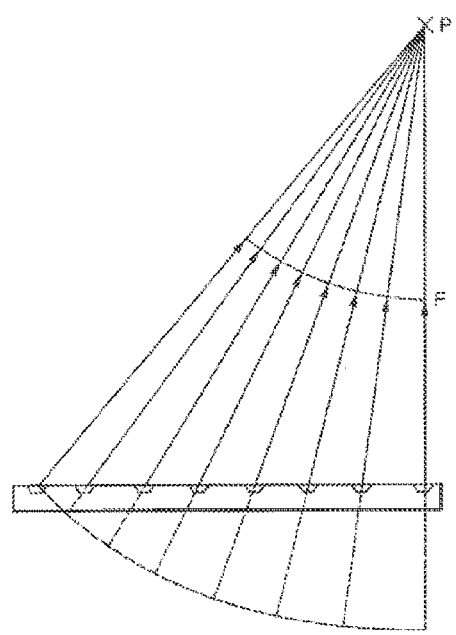
FIG. 12 illustrates an embodiment of a method of controlling the directivity and shape of an ultrasonic beam.

According to some embodiments, the shape of the ultrasonic beam is also controlled (that is to say the angle which defines the opening of the beam). An example of a shape is a cone, wherein the angle of the cone can be predefined. FIG. 12 illustrates a 1D view of a 2D array that is creating a beam having a shape of a cone.

For example, when an object is detected, the controlling unit can reduce said angle to focus the ultrasonic beam on a part of the object.

The predefined directivity (respectively predefined shape) can be achieved by selecting parameters of the control (step 80), such as selecting the moving elements to move at each time clock.

The use of an ultrasonic beam with a predefined directivity and/or shape allows concentrating the energy of the wave towards a particular direction, and thus towards a particular part of the object.

According to some embodiments, the controlling unit controls the directivity and/or the shape of the ultrasonic beam so that the directivity and/or the shape are made to vary during time.

The directivity of the ultrasonic beam can be chosen for instance on a priori knowledge or at least rough knowledge of the position and/or form of the object to be detected. The directivity of the ultrasonic beam can also be chosen based on data input by a user, or by data provided by external sensors (such as additional position sensors which provide indications on the position of the object to detect).

The directivity of the ultrasonic beam can also be controlled based on previous data collected from previous cycles of the method. For example, if the controlling unit has determined that the object has a given position or a given form in the previous control cycles, it can predict to what direction the ultrasonic beam should be sent in the next control cycle(s) so as to follow the external surface of the object to be detected. The controlling unit can use predefined forms or pre-known forms of the object to predict the direction of the ultrasonic beam that is to be used in the next control cycle(s).

The directivity of the ultrasonic beam can also be preset. For example, the directivity of the ultrasonic beam can be chosen so as to follow a particular path in space. For example, it can be controlled to cover a cube, wherein the ultrasonic beam scans parallel lines inside the cube. Other paths can be used.

According to some embodiments, the controlling unit controls the directivity of the ultrasonic beam so as to scan the space, until an object is detected.

According to some embodiments, the controlling unit controls the directivity of the ultrasonic beam so as to scan the space, until an object with predefined parameters is detected (such as, but not limited to, an object with a predefined location/position/form . . . ).

The method can then comprise the step 72 of sensing the reflected ultrasonic waves (similar to step 51) and the step 73 of detecting at least the position of at least part of the object (similar to step 52).

As illustrated in FIG. 7, the method can be iterative. A step 70 (which can be performed after step 73 or after step 72) can comprise the step 70 of selecting parameters for choosing the directivity of the ultrasonic beam for the next control cycle. As a consequence, the ultrasonic beam can have a direction which varies in time.

An application of this control is to scan the space and detect an object or objects in it. According to some embodiments, the controlling unit can detect that the ultrasonic sound waves are no longer reflected by the object when a variation of the position of the calculated reflecting surface is above a threshold, which can indicate that another object now reflects the ultrasonic sound waves.

The scan of the object can allow the controlling unit to calculate the evolution of the position of the external surface of the object in space. Indeed, at each control cycle, the controlling unit can calculate a position of the reflecting surface. The junction of these positions represents the form of the external surface of the object. As a consequence, it is possible to reconstruct the form of the external surface of the object.

The calculation of the position of the reflecting surface of the object during time can also be used to compute values representing the motion of the object such as the evolution of its position in time and/or its velocity and/or its acceleration.

According to some embodiments the controlling unit controls the directivity of the ultrasonic beam shaped initially as a knife edge so as to scan the space in one direction. When the presence of an object is detected, the controlling unit can add a single knife edge scan in an orthogonal direction and later used a focused beam to scan the area of interest.

As mentioned with respect to FIG. 1, the system 10 can be a dual sound and detection system.

Thus, according to some embodiments, the system 10 can be used during some tine intervals to produce audible content, and at other time intervals to calculate at least the position of at least part of an object present in space.

Figure 8:
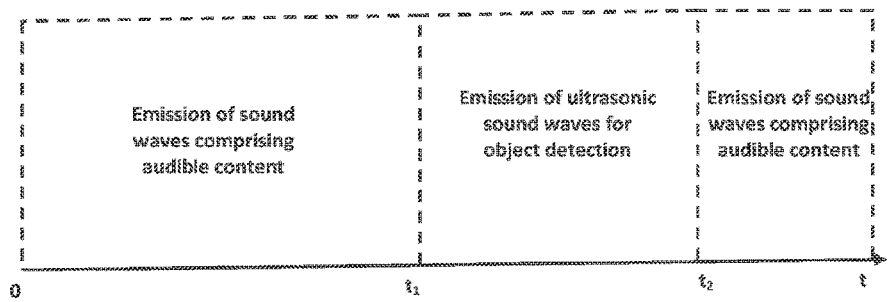
FIG. 8 illustrates a possible control sequence of the pressure-pulse producing elements, for producing audible content and ultrasonic sound waves.

FIG. 8 illustrates an embodiment of such a dual use.

According to this embodiment, during a first time period (from time t=0 to time t=t1 in the non limiting embodiment of FIG. 8), a controlling unit (such as controlling unit 11 and/or 20) can control the digital sound reconstruction speaker apparatus to produce sound waves which comprise (mainly) audible sound (the sound waves comprise as a by-product ultrasonic sound waves). In other words, during this first time period, the sound and detection system is used mainly as a digital sound reconstruction speaker. For example, music or speech is produced by the digital sound reconstruction speaker. Other audible sounds can be produced depending on the needs and/or on the application. Embodiments of possible control of the moving elements for producing audible sound will be described later in the specification, and are also known e.g. from the patent application WO 2009/066290 of the Applicant, which is incorporated herein by reference in its entirety. According to some embodiments, the sound waves comprising audible content and emitted during these time periods can be produced to have a predetermined directivity pattern.

When the controlling unit (such as the controlling unit 11 and/or 20) decides that a detection of at least the position of at least part of an object has to be performed, it controls the digital sound reconstruction speaker apparatus to produce ultrasonic sound wavesbeam directed towards space, for example in compliance with the methods of FIG. 5 or FIG. 7.

The decision to switch to object detection can be taken based on various factors, such as (but not limited to) user input, data sensed by other sensors, predefined time schedule of the control performed by the controlling unit, etc.

Once the ultrasonic sound waves needed for performing the detection of at least the position of the object have been sent, the controlling unit can switch back (if necessary immediately, or after an additional time delay) to the production of sound waves comprising audible content (after time t2 until time t3).

In the embodiment of FIG. 8, when the controlling unit controls the digital sound reconstruction speaker apparatus to produce ultrasonic sound waves, the production of audible content is stopped.

Figure 9:
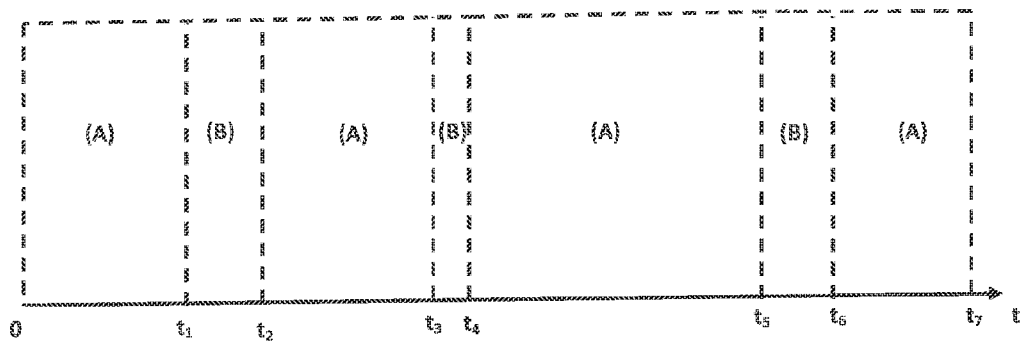
FIG. 9 illustrates another possible control sequence of the pressure-pulse producing elements, for producing audible content and ultrasonic sound waves.

FIG. 9 illustrates another embodiment of the method of FIG. 8.

In this embodiment, a controlling unit controls the actuation of the plurality of pressure-producing elements so as to produce:
- sound waves comprising (mainly) audible content during a first subset of time intervals (in this embodiment, during $[0;t_1]$, $[t_2;t_3];[t_4;t_5];[t_6;t_7]$), and
- at least an ultrasonic beam during a second subset of time intervals (in this embodiment, during $]t_1;t_2[,]t_3;t_4[;]t_5;t_6[$). The sensing of the reflected beam can be performed even during the emission of audible content.

It is to be noted that the second subset of time intervals does not necessarily comprise the time required for detecting and post-processing the sensed signals, such as the detection of the object or the calculation of physical or inertial parameters of the object. This post-processing can be performed at any time interval.

In this embodiment, the controlling unit alternates several times between the production of sound waves comprising audible content and the production of ultrasonic sound waves.

According to some embodiments, the controlling unit selects the first subset of time intervals and/or the second subset of time intervals (in particular their duration, and/or their frequency can be selected) so as to produce audible content (with a quality which depends on the afore-mentioned selection) and to detect at least the position of the object.

According to some embodiments, the controlling unit is configured to control the actuation of the plurality of moving elements so as to alternate between the production of at least an ultrasonic beam during a first subset of time intervals and the production of audible content during a second subset of time intervals, wherein the breaks in the audible content produced by the digital sound reconstruction speaker apparatus during the second subset of time intervals do not produce unwanted audible distortion to the audible content.

According to some embodiments, the level of unwanted audible distortion depends on the application. If the user is parking his vehicle (it will be described later in the specification that the sound and detection system can be embedded on a vehicle to detect obstacles and emit for example audio messages or warnings for assisting vehicle parking), a predefined level of audible distortion can be acceptable.

If the user is listening to music (e.g. which does not comprise silent portions), it is desired to avoid audible distortion. In this case the control can avoid producing audible distortion to the audible content. It is thus possible to hear audible content and detect an object, without interrupting the listening session for the user (e.g. the user does not "feel" that breaks are made during the production of ultrasound).

A possible embodiment for obtaining audible content with no audible distortion caused by the breaks (or with an audible distortion caused by the breaks which is less than a threshold) comprises selecting a reduced duration for the intervals of time belonging to the second subset of time intervals, but which still allows the detection of the object.

Another possible embodiment for obtaining audible content with no audible distortion caused by the breaks (or with an audible distortion caused by the breaks which is less than a threshold) comprises performing, by the controlling unit, a control which alternates between the first subset of time intervals and the second subset of time intervals in an irregular manner. As a consequence, the human ear will not be able to detect that the audible content is interrupted by the production of ultrasonic sound waves during the second subset of time intervals.

According to some embodiments, the sound and detection system comprises at least two digital sound reconstruction speaker apparatus. The controlling unit can control one of the digital sound reconstruction speaker apparatus to produce sound waves comprising audible content (according to some embodiments, the controlling unit controls at least a regular sound speaker for producing audible content), and, simultaneously, controls the other digital sound reconstruction speaker apparatus to emit an ultrasonic beam.

According to some embodiments, the controlling unit receives information on the audible content to produce, said information indicating the time intervals of the audible content which are of less "importance" (the "importance" can be assessed based on many criteria that can be chosen by the user and can depend e.g. on the content of the sound). As a consequence, the controlling unit can control the digital sound reconstruction speaker apparatus to produce ultrasonic sound waves during these time intervals of less importance.

For instance, these time intervals can correspond to "silent" portions of the audible content. Alternatively, the controlling unit can pre-process the digital signal which represents the sound to produce, in order to identify these portions.

For a sound signal of an entertainment source, these time intervals can correspond to advertisements.

These embodiments are non limitative.

A control of the moving elements in order to produce sound waves comprising audible content or ultrasonic sound waves (as required e.g. in step 50) will now be described.

Figure 10:
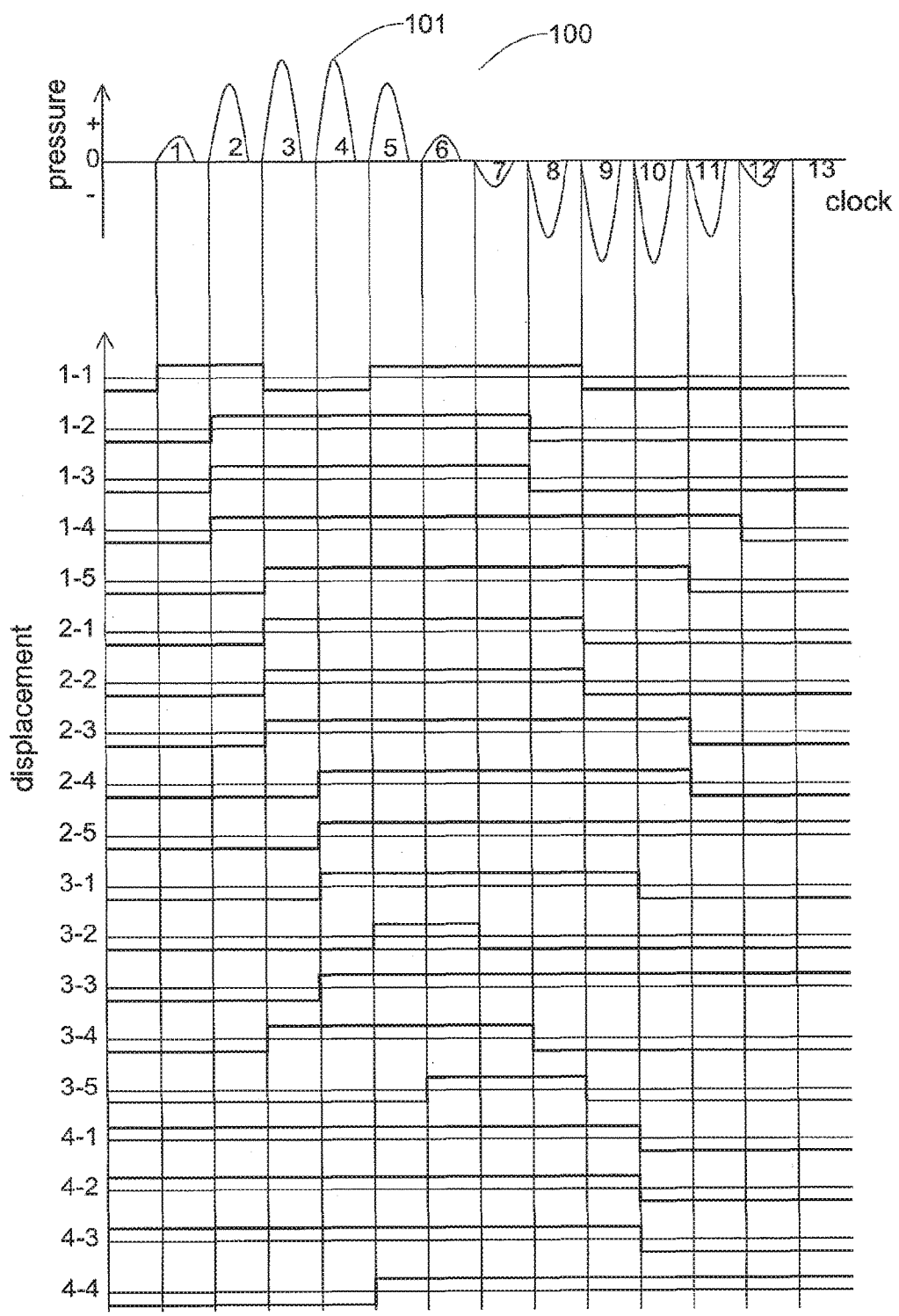
FIG. 10 illustrates a possible timing for controlling the plurality of pressure-pulse producing elements and producing a desired sound or ultrasound wave.

FIG. 10 shows an embodiment of a control that can be applied to an array of 24 pressure-pulse producing elements comprising each a moving element. In this non limiting example, the pressure-pulse producing elements are located e.g. on a matrix of 5 rows and 5 columns, wherein the central element is missing (in FIG. 10, the reference "i-j" corresponds to the $i^{th}$ row and $j^{th}$ column). In practice, a larger number of pressure-pulse producing elements can be used for each array of each digital sound reconstruction speaker apparatus, such as (but not limited to) 1024 pressure-pulse producing elements.

As shown, FIG. 10 is a composite graph of the respective displacements of the moving elements 1-1, . . . , 1-5, 2-1, . . . , 2-5, 3-1, . . . , 3-5, 4-1, . . . , 4-4 which, in combination, provide the total pressure effect 110.

At the beginning of time clock "1", moving element 1-1 is released and latched to an upper position, thus creating a positive pressure pulse with amplitude of "1".

At the beginning of time clock "2", moving elements 1-2, 1-3 and 1-4 are released and latched to an upper position, thus creating a positive pressure pulse with amplitude of "3".

At the beginning of time clock "3", moving elements 1-5, 2-1, 2-2, 2-3 and 3-4 are released and latched to an upper position, and moving element 1-1 is moved and latched to a lower position thus creating a positive pressure pulse with amplitude of "4" (corresponding to 5 minus 1).

At the beginning of time clock "4", moving elements 2-4, 2-5, 3-1 and 3-3 are released and latched to an upper position, thus creating a positive pressure pulse with amplitude of "4".

At the beginning of time clock "5", moving elements 1-1, 3-2 and 4-4 are released and latched to an upper position, thus creating a positive pressure pulse with amplitude of "3".

At the beginning of time clock "6", moving element 3-5 is released and latched to an upper position, thus creating a positive pressure pulse with amplitude of "1".

At the beginning of time clock "7", moving element 3-2 is moved and latched to a lower position thus creating a negative pressure pulse with amplitude of "−1".

At the beginning of time clock "8", moving elements 1-2, 1-3, 3-4 are moved and latched to a lower position thus creating a negative pressure pulse with amplitude of "−3".

At the beginning of time clock "9", moving elements 1-1, 2-1, 2-2, and 3-5 are moved and latched to a lower position thus creating a negative pressure pulse with amplitude of "−4".

At the beginning of time clock "10", moving elements 3-1, 4-1, 4-2 and 4-3 are moved and latched to a lower position thus creating a negative pressure pulse with amplitude of "−4".

At the beginning of time clock "11", moving elements 1-5, 2-3 and 2-4 are moved and latched to a lower position thus creating a negative pressure pulse with amplitude of "−3".

At the beginning of time clock "12", moving element 1-4 is moved and latched to a lower position thus creating a negative pressure pulse with amplitude of "−1".

Thus, as shown in this Figure, the control of the number of moving elements which are moved at each time, and the time at which these moving elements are moved, controls the height of the pulse 101 produced after each time clock.

The envelope of all pulses 101 represents the sound wave which is produced.

The frequency of the sound wave depends on the shape of the envelope of the pulses. It is thus possible to produce a desired sound wave in the audible frequency range or in the ultrasonic frequency range.

According to some embodiments, the frequency of the control clock is correlated to the natural resonance frequency of the moving element. For instance, this control has a frequency which is a multiple of the natural resonance frequency of the moving element.

It should be noted that in order to control the directivity and shape of the emitted sound as described later on, the position of each of the moving elements or groups of moving elements in the digital speaker that are actuated in each clock is determined by the required direction and shape of the sound, so the description in FIG. 10 in which the moving element selection seems to be no importance, is simplistic and shown as it is just for the sake of clarity.

Methods for controlling the directivity of sound waves will now be described. These methods can be used in order to produce the ultrasonic beam with a desired directivity (and if necessary with a desired shape).

Figure 11:
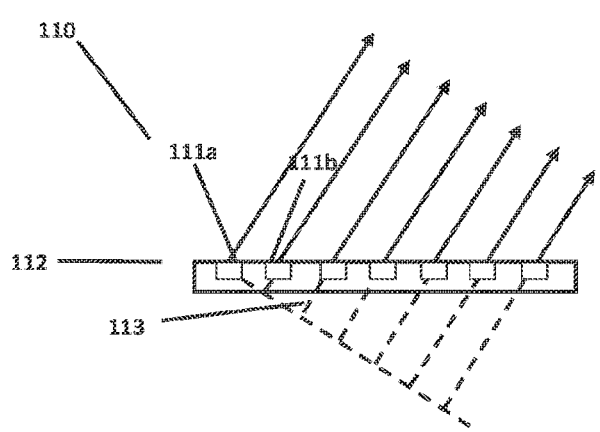
FIG. 11 illustrates an embodiment of a method of controlling the directivity of ultrasonic sound waves.

FIG. 11 illustrates an array 110 comprising a plurality of pressure-pulse producing elements 111a, 111b, etc. In order to produce ultrasonic sound waves which have a direction which is tilted with respect to a vertical axis, the controller can apply a control signal winch has a delay which increases from left to right along the axis 112 of the array (for example, the delay increases linearly). The delays applied to the control signals before they are sent to each of the pressure-pulse producing element can be visualised by the dotted lines 113. A longer dotted line represent a longer delay time.

Thus, in FIG. 11, the control signal sent to the pressure-pulse producing element 111a has no delay, so that the pressure-pulse producing element is the first to send ultrasonic sound waves, the control signal sent to the pressure-pulse producing element 111b has a delay with respect to the control signal sent to the pressure-pulse producing element 111a, so that the pressure-pulse producing element 111b is the second to send ultrasonic sound waves, etc.

Substantially parallel ultrasonic sound waves are obtained, which are tilted with respect to a vertical axis.

FIG. 12 illustrates the formation of an ultrasonic beam which is directed and focused towards a point in space P (this method is also called "beam forming" in the art). It should be noted that FIG. 12 is a 1D representation of a 2D array of a digital sound reconstruction speaker that forms a 3D focused beam represented here in 2D.

This can be achieved e.g. by choosing the delays of the control signals sent to the pressure-pulse producing elements, so that the sum of the delay plus the sound travel time from the different pressure-pulse producing elements to the point in space P is the same for each pressure-pulse producing element of the array.

As illustrated in FIG. 12, the delays applied to the control signals increases from left to right, but not linearly. This produces a curved wave front F which converges on the focus point P such that the sound intensity at and around the focus point (in a region of dimensions substantially equal to a wavelength of each of the spectral components of the sound) is higher than at other points nearby. The directivity and the shape of the beam are thus controlled.

Similar controls apply to the two dimensional matrix of pressure-pulse producing elements that make the array of the digital sound reconstruction speaker, to produce a 3D focused and shaped beam (see e.g. the array of FIG. 2 or FIG. 4).

Other possible controls of the digital sound reconstruction speaker apparatus for producing sound waves with a desired directivity pattern and shape are described in the patent applications WO 01/23104 and WO 2007/135678 which are incorporated herein by reference.

It is to be noted that the use of an ultrasonic beam with a predefined directivity pattern, rather than a sound beam mainly located in the audible frequency range, allows creating a narrower beam. Thus, the ultrasonic beam can be more focused on parts of the object and provides a more precise and detailed detection of the object.

According to some embodiments, the ultrasonic beam may be emitted in a wide band frequency (for example, in a frequency range from 60 KHz to 100 KHz). The use of a wide band frequency may enable more precise distance and position location than when using a narrow band signal (for example, in a frequency range from 98 KHz to 100 KHz). According to other embodiments, any frequency in the ultrasonic range can be used for the ultrasonic beam.

The distance between the two far pressure-pulse producing elements of the digital sound reconstruction speaker (that is to say the pressure-pulse producing elements located at each extremity of the array) also influences the narrow shape of the beam. In particular, the wider this distance, the narrower the emitted beam will be.

According to some embodiments, when the available number of moving elements is large enough, either by using multiple digital sound reconstruction speakers or using high count moving element digital sound reconstruction speaker, both tasks of creating audio content and directed (and if necessary shaped) ultrasonic sound beam can be performed at the same time. In the non limiting example of FIGS. 8 and 9, the controlling unit performs a control which alternates between the production of audible content in at least a first time interval and the production of a directed (and if necessary shaped) ultrasonic beam in at least a second time interval, whereas in this embodiment, the controlling unit can perform both tasks in the same time interval. Similar methods that were described in the previous embodiments can be used, but in this embodiment for a simultaneous control of at least a first subset of the moving elements for producing audible content and at least a second subset of the moving elements for producing an ultrasonic beam.

According to some embodiments, the ultrasonic sound waves produced when creating audio sound by the digital sound reconstruction speaker may be used for detecting at least the location of the position of an object in space, at lower accuracy than when using a dedicated (if necessary shaped) ultrasonic beam scanning (as described previously with respect e.g. to FIGS. 5 and 7). Indeed, as already mentioned, when the digital sound reconstruction speaker produces audio content, ultrasonic sound waves are also produced, which thus can be used for detection of at least the position of an object.

There is now described a method for detecting at least the position of objects or surfaces which are located in an environment with low visibility, and/or located behind an obstacle.

Figure 13:
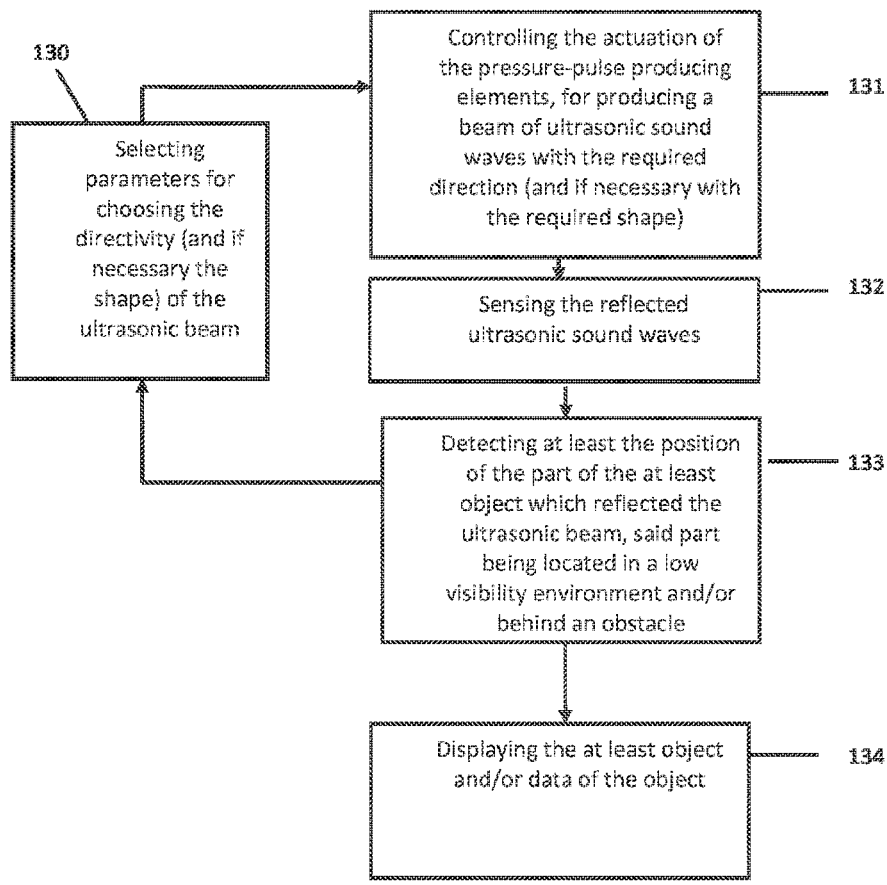
FIG. 13 illustrates an embodiment of a method of detecting at least the position of an object located in a low visibility environment and/or located behind an obstacle.

FIG. 13 is a non limitative embodiment of such a method.

As shown, the method can comprise the step 131 of controlling the actuation of the pressure-pulse producing elements, for producing an ultrasonic beam towards space with the required direction (and according to some embodiments required shape), the step 132 of sensing the reflected ultrasonic waves and the step 133 of detecting at least the position of at least part of the object. This at least part of the object is located in an environment with low visibility (or with no visibility, since the system detects the object based on ultrasound waves), and/or located behind an obstacle.

The method can comprise a step 134 of displaying the object on a screen, and/or data of the object (such as the data that were mentioned in the previous embodiments, which include the dimensions, the distance, the form, the direction, data representing the motion, and sound reflecting properties of at least part of the object).

If necessary, the controlling unit can select parameters for choosing the directivity of the ultrasonic beam at the current and/or next control cycle(s) (step 130).

The environment with low visibility can comprise for example smoke, fog, fumes, steam, etc.

According to some embodiments, the environment is a light-absorbing environment.

If the part of the object is located behind an obstacle, the ultrasonic beam can be sent towards reflectors which are located in the environment of the object. The ultrasonic beans can be reflected by said reflectors and thus reach the object even if it is located behind an obstacle. By sensing the ultrasonic sound waves reflected back by the object and the reflectors, the system can calculate various data on the object, such as its position.

In this embodiment, the reflectors are thus used as ultrasonic mirrors. This requires knowledge on the position of the reflectors which are present in the environment. The reflectors include for example the walls.

Figure 14:
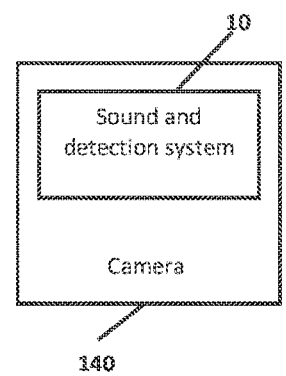
FIG. 14 illustrates a camera which can perform the method of FIG. 13 and display calculated data.

FIG. 14 shows an embodiment of a system 140 that can be used to perform the method of FIG. 13. The system 140 comprises the sound and detection system 10.

This system can be viewed as camera which allows visualizing objects and/or data of the objects even if the visibility of the object is low (due to the environment and/or to the presence of obstacles). In addition, this camera can be used as a loud speaker. For example, firemen can wear this camera to detect objects through smoke, and can also use the camera to provide audio communication.

There is now described an audio sound system which takes advantage of the sound and detection system described previously. The description of the different parts of this system applies herein, mutandis mutandis.

Figure 15:
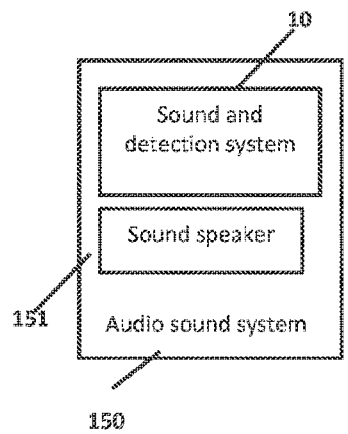
FIG. 15 illustrates an embodiment of an audio sound system capable of detecting at least the position of an object in space.

As shown in FIG. 15, the audio sound system 150 comprises the sound and detection system 10 and can further comprise at least an additional sound speaker 151 (according to some embodiments, the audio sound system 150 does not comprise an additional sound speaker 151). The ultrasonic sensor 13 (described in FIG. 1) can be part of the system 150 or external to it.

During some time intervals, the audio sound system 150 can produce sound waves comprising (mainly) audible content (through the digital sound reconstruction speaker apparatus), and during other time intervals, the audio sound system 150 can send ultrasonic sound waves for detecting at least the position of an object.

According to some embodiments, the audio sound system 150 is configured to map at least part of the area surrounding the audio sound system. This mapping can be used to control parameters of the audible sound produced by the audio sound system 150.

Figure 16:
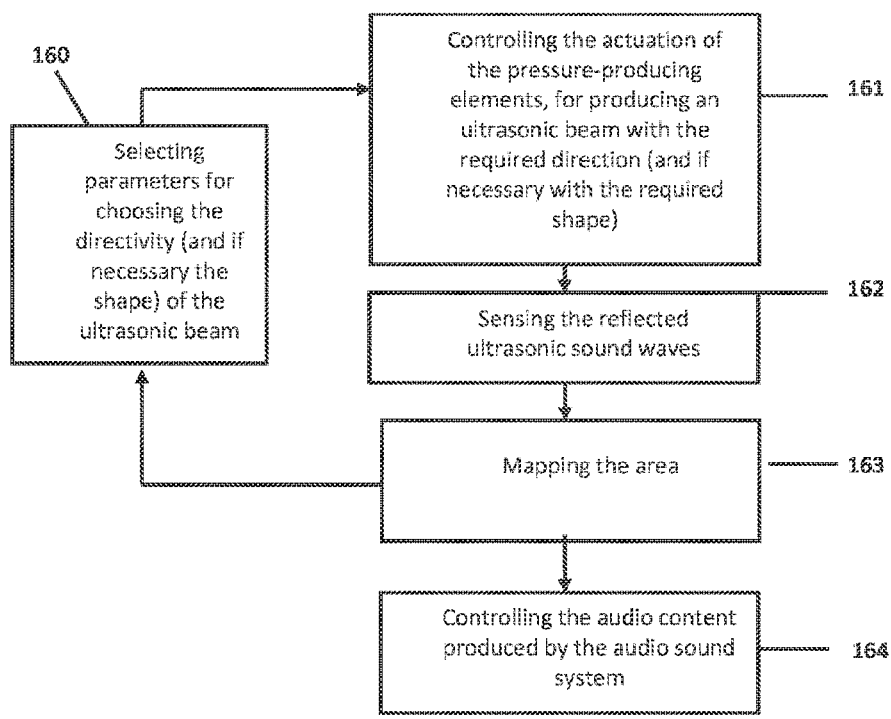
FIG. 16 illustrates an embodiment of a method of mapping an area around an audio sound system and using the data to adapt the sound to the mapped area.

As shown in the non limiting embodiment of FIG. 16, the method can comprise a step 160 wherein a controlling unit selects the parameters for choosing the directivity of the ultrasonic beam. Step 160 is similar to step 70 of FIG. 7.

Figure 17:
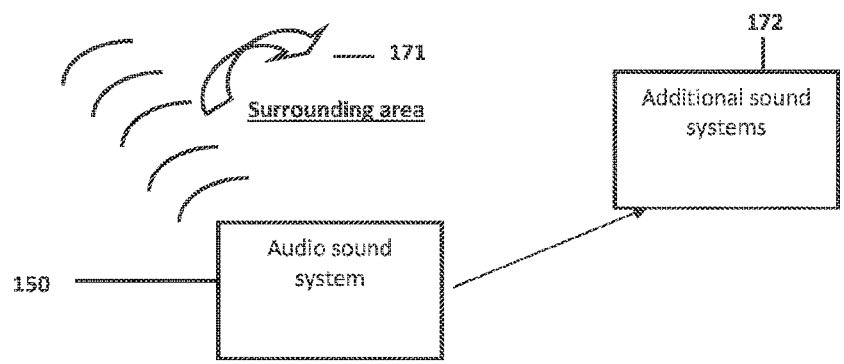
FIG. 17 illustrates an example of a scan of the space by the audio sound system of FIG. 15.

According to some embodiments, the controlling unit changes the directivity pattern of the ultrasonic beam during different control cycles (or during different groups of control cycles), so as to scan the surrounding area. FIG. 17 illustrates such a scan of the surrounding area in a non limiting way (arrow 171 represents the evolution of the direction of the ultrasonic beam during the different control cycles).

According to some embodiments, a scan with an angle of view of 180 degrees is obtained. This value is not limitative.

The method can comprise a step 161 of controlling the actuation of the pressure-pulse producing elements, for producing an ultrasonic beam with the desired directivity. Step 161 is similar to step 71 of FIG. 7.

As already described in the previous embodiments, the audio sound system 150 can alternate between the emission of ultrasonic sound waves and the emission of sound waves comprising audible content. Various patterns for this control were described in the previous embodiments and apply here.

The method can then comprise a step 162 of sensing the ultrasonic sound waves reflected by the elements present in the area surrounding the audio sound system. Step 162 is similar to step 72 of FIG. 7.

The method can then comprise a step 163 of mapping the area surrounding the audio sound system. This mapping can be performed by a controlling unit of the audio sound system, or by an external controlling unit operable on a processing unit.

The audio sound system 150 can learn about the physical parameters of the elements of the area in which it is located, and can thus map the area. This mapping can comprise building a representation of the elements of the area. This representation can comprise the position and/or the form and/or the dimensions and/or the distance and/or data representing the motion of the elements and/or the sound reflecting properties of at least part of the elements present in the area surrounding the audio sound system. This representation can be stored in a memory of the audio sound system, and can be updated from time to time, or continuously. This representation can also be output to a user through a displaying unit (such as a screen).

The audio sound system 150 can be configured to control the emission of the sound waves comprising audible sound (step 164 in FIG. 16) based on the mapping of the surrounding area.

In particular, it can control the directivity pattern of the audible content (see FIGS. 11 and 12 for examples of the control of the directivity pattern). It can also control other parameters of the sound waves such as different amplitude, frequency or content to different directions.

For example, if the audio sound system 150 has detected that a strong reflector is present in a given direction (for example, when a curtain is moved from a window), it can lower the amplitude of sound waves projected towards this direction.

An optimization of the directivity of the sound waves can be achieved.

According to some embodiments, the audio sound system can adjust the directivity pattern of the sound waves after each time it updates its representation of the elements present in the surrounding area. According to some embodiments, a continuous and dynamic optimization of the directivity pattern of the sound waves is thus achieved.

According to some embodiments, the audio sound system 150 is used to map the area, and this mapping is communicated to additional sound systems (see reference 172 in FIG. 17, which can include additional sound speakers) present in the same area. These additional sound systems can thus use this mapping to control their emission of sound waves.

According to some embodiments, the audio sound system 150 can be configured to detect particular elements of the area. According to some embodiments, the audio sound system 150 is configured to detect at least the position of listeners in the area. The audio sound system can thus locate and map at least the position of the persons that are currently listening to the audible content emitted by the audio sound system.

According to some embodiments, the listeners can be physical devices, such as sound sensors which detect the sound emitted by the audio sound system.

Figure 18:
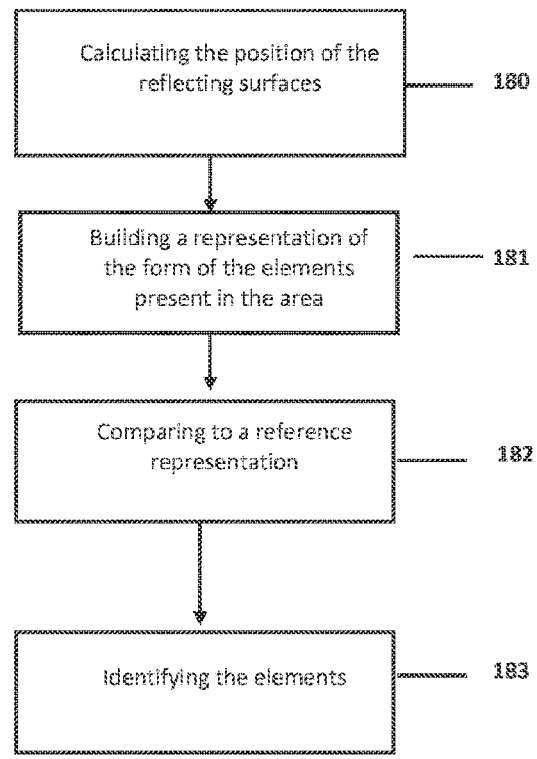
FIG. 18 illustrates an embodiment of a method of identifying elements present in the area surrounding the audio sound system, such as humans.

The identification of the listeners can be performed as described in the non limiting embodiment of FIG. 18.

A controlling unit (such as the controlling unit of the audio sound system) calculates the position of the reflecting surfaces (step 180), and can thus calculate the form of the elements which reflected the ultrasonic sound waves (step 181). The controlling unit can compare the calculated form to a reference representation (step 182), in order to identify the elements present in the area (step 183). For example, it can identify a human. If the comparison provides a result which complies with a matching criterion, the audio sound system can determine that a listener is present at this position.

The audio sound system can further calculate the sound reflecting properties of the elements present in the area, and compare the calculated value to an expected range of values. This can confirm that the element which was detected is for example a human.

The method can comprise a subsequent step of controlling the directivity pattern of the sound waves of the audio sound system. This control can comprise selecting the directivity pattern of the sound waves of the audio sound system so as to orient them towards the listener.

According to some embodiments, the audio sound system 150 is configured to provide active noise cancellation based on the detection of the elements present in the area and/or based on the position of the listeners and/or at other positions in space where the noise cancellation should be optimal.

According to some embodiments, the audio sound system 150 is embedded in a vehicle.

According to some embodiments, the audio sound system 150 can be used to map the interior of the vehicle, in order to control/optimize the sound waves sent by the audio sound system. This control can comprise sending different content to different directions, optimizing volume in target areas, adapting the audio to the presence of many reflectors i.e. passengers or missing reflectors such as an open window.

According to some embodiments, the audio sound system 150 can be used to locate the position of the passengers in the vehicle, in order to optimize the sound waves sent by the audio sound system.

According to some embodiments, the audio sound system 150 can be used to locate the position of the passengers in the vehicle, in order to perform an active noise cancellation specific to each passenger.

A system for vehicle parking assistance is now described. The expression "parking assistance" can comprise assistance to a human driver, or assistance for automated parking.

Figure 19:
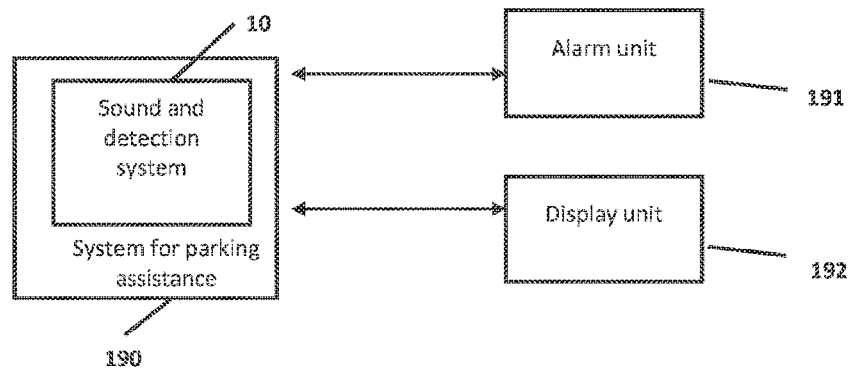
FIG. 19 illustrates an embodiment of a system for assisting the parking of a vehicle.

As shown in FIG. 19, a system 190 for vehicle parking assistance can comprise the system 10 described with reference to FIG. 1. The ultrasonic sensor 13 (described in FIG. 1) can be part of the system 190 or external to it.

As shown, the system 190 can communicate through any adapted wire and/or wireless communication channels with for example an alarm unit 191 (such as an alarm unit which can produce visual and/or audio alerts e.g. to the people present around the vehicle), and/or a display unit 192 (such as a screen present in the vehicle).

According to some embodiments, the system 190 is embedded in a vehicle. Similarly, the system 190 can comprise a plurality of digital sound reconstruction speaker apparatus and a plurality of sensors (such as sensors 13). A first digital sound reconstruction speaker apparatus is for example mounted on the rear part of the vehicle, and a second digital sound reconstruction speaker is for example mounted on a lateral part of the vehicle. This allows the detection of at least the position of objects located in different directions of the vehicle.

Figure 20:
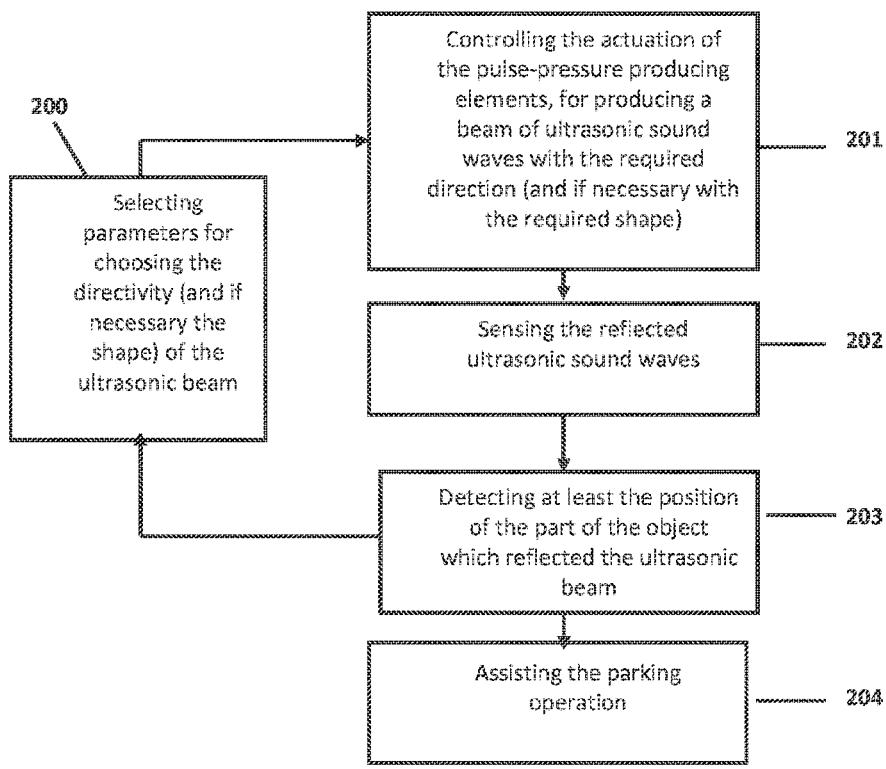
FIG. 20 illustrates an embodiment of a method of assisting parking of a vehicle.

FIG. 20 illustrates a possible method of assisting the parking of a vehicle. The method can comprise steps 200 to 203 which are similar e.g. to steps 70 to 73 of FIG. 7.

If the system 190 is located on the vehicle, it can detect obstacles and help the vehicle to avoid them during the parking phase.

The position of the obstacles can also be displayed on a display unit of the vehicle and indications to avoid these obstacles can be displayed.

According to some embodiments, the system 190 can detect the presence of humans (as explained with reference to FIG. 18 for another application), and provide an audible alert to said human using the digital sound speaker reconstruction apparatus of the system 190.

Figure 21:
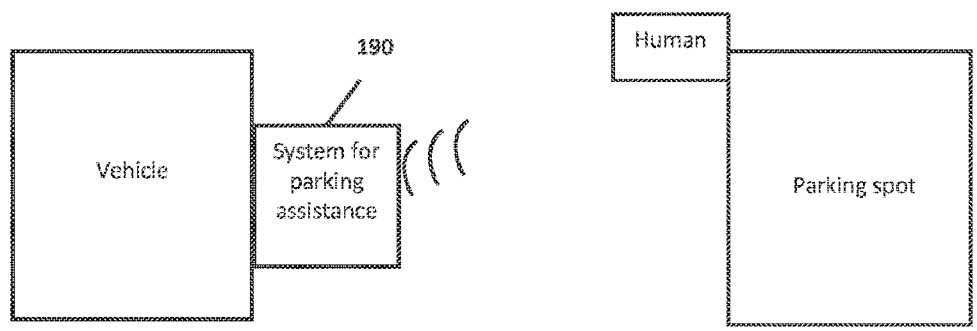
FIG. 21 illustrates an embodiment of the detection of a human present near a parking spot.

This is shown in FIG. 21, wherein a human is present near the parking spot. In this example, the human is detected by the system 190.

According to some embodiments, the system 190 can produce predefined audio messages, e.g. for alerting a human or providing audio instructions. These audio messages can be stored for example in the alarm unit 191.

Figure 22:
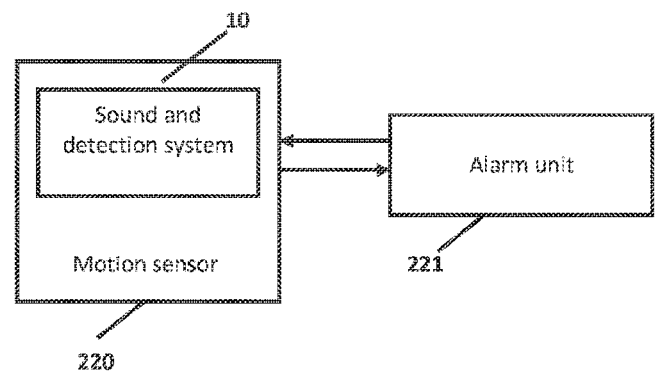
FIG. 22 illustrates an embodiment of a motion sensor.

FIG. 22 illustrates an embodiment of a motion sensor 220 which uses the system 10 described previously.

Motion sensors are for example used for security purposes (this embodiment is not limitative). They can detect the presence and/or the motion of people or objects, in order to provide an alert or take any appropriate security actions.

As already explained in the various previous embodiments, the system 10 comprises at least one digital sound reconstruction speaker apparatus which sends at least an ultrasonic beam. The directivity of the ultrasonic beam can be controlled by a controlling unit of the system 10.

By detecting the reflected ultrasonic waves with a sensor (which can be part of the motion sensor 220 or external to it), the system can detect reflecting surfaces and calculate various data such as position, velocity, etc.

If the motion sensor 220 detects that the position of the object varies and that the evolution of this position in time does not comply with a security threshold, it can send an alarm signal to an alarm unit 221 for raising an alarm (such as, but not limited to, an audio alarm). For example, if the evolution of the position in time of the object is above a threshold, this can show that a moving object is present in the field of view of the motion sensor. An alarm can thus be raised.

According to some embodiments, since the motion sensor 220 comprises at least a digital sound reconstruction speaker apparatus, it can raise an audio alarm by itself.

According to some embodiments, a sound and detection system that is used for producing e.g. music at home or in an office, or parts of it, can be also used as a motion sensor based alarm.

A system configured to detect a gesture is now described. A gesture can be defined by a form/shape of part of a human body, and/or by a particular motion of a part of a human body. For example, a gesture can include a particular motion of a human's hand, such as (but not limited to) a movement from a bottom position to an upper position. It can include also a particular shape of the hand which corresponds to a particular gesture.

In particular, the system can be configured to remotely detect a gesture, via ultrasound waves (touch-less detection).

Figure 23:
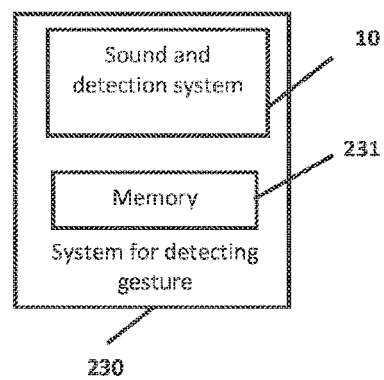
FIG. 23 illustrates an embodiment of a system for detecting gesture.

As illustrated in the embodiment of FIG. 23, a system 230 for detecting a gesture can comprise a system 10 as described in the various previous embodiments. It can also comprise a memory 231.

This memory 231 can store gesture definitions, which comprise e.g. motions of parts of a body and/or characteristics of said parts of a body (such as their form, their size etc.). A non limitative embodiment of a gesture definition can be a hand which moves from left to right. In this case, the memory 231 can store a motion from left to right (which comprises e.g. the variation of the coordinates in space corresponding to this motion, the velocity, etc.) and/or physical characteristics of a hand.

These gesture definitions can comprise, for each part of the body, a plurality of trajectories, each trajectory or each subset of trajectories corresponding to a particular gesture.

According to some embodiments, the user performs a training session for defining typical gestures, which can then be stored in the memory 231. This training session can be performed with the system 230 or with another system configured to detect gestures (such as a system comprising a camera and a processing unit running a method for detecting objects in an image or in a video).

Figure 24:
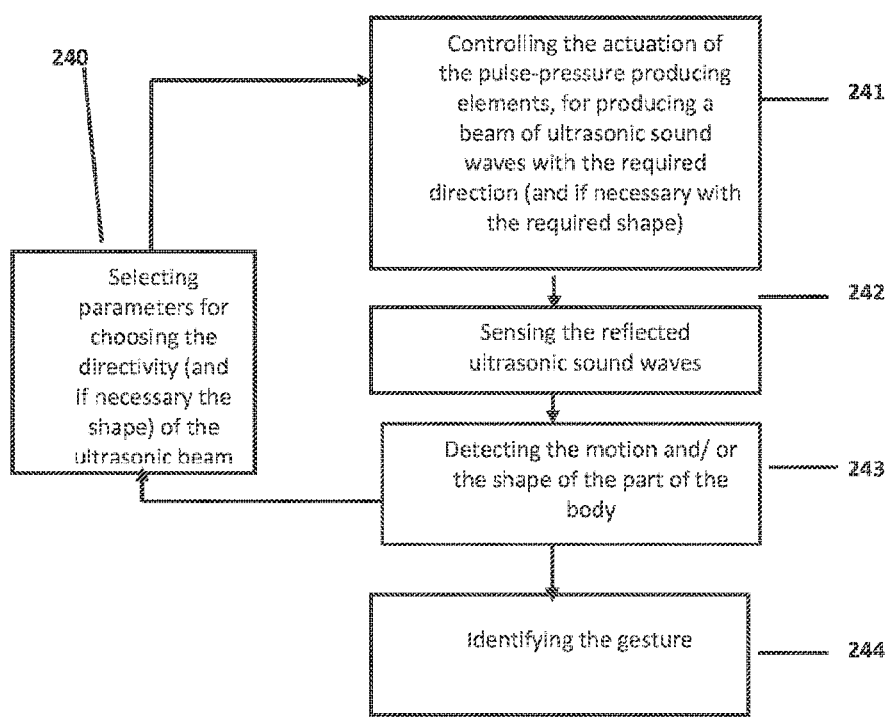
FIG. 24 illustrates an embodiment of a method of detecting a gesture.

FIG. 24 illustrates a possible method for detecting a gesture.

The method can comprise steps 240 to 243 which are similar e.g. to steps 70 to 73 of FIG. 7.

At step 243, the method can comprise calculating the position of the different reflecting points of the part of the body. This allows calculating the shape of the part of the body.

In addition, since ultrasonic sound waves are repeatedly sent, the method can comprise calculating the evolution of the position of the part of the body, which represents the motion of said part, i.e. the gesture of said part.

The method can then comprise identifying the gesture of the part of the body (step 244). The identification can comprise comparing the detected motion and/or shape with a repository of predefined gestures (stored e.g. in the memory 231).

A possible use of the system 230 could be to integrate it in a device such as a television (this example not limitative). The user can listen to the audio content of the television which is produced by audio speakers, which can comprise the digital audio speaker apparatus of the system 230. If the user wants to command the television, he can make a gesture with his hand, such as a bottom-up gesture which can be defined as a command for increasing sound. The gesture is identified by the system 230. The system 230 communicates with a controlling unit of the television for increasing sound.

This example is however non limitative.

More generally, the controlling unit can compute a control signal based on the identification of the gesture in order to control an electronic device (TV, computer, fridge, etc.). Thus, a user can control remotely a device based on his gestures.

Various other applications can use the different systems and methods previously described.

The invention contemplates a computer program being readable by a processing unit for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A sound and detection system comprising:
   at least a digital sound reconstruction speaker apparatus, comprising a plurality of pressure-pulse producing elements arranged in an array, wherein each pressure-pulse producing element comprises at least a moving element, an upper electrode and a bottom electrode,
   at least a controlling unit configured to control a time clock and voltages applied to said moving element and said upper and bottom electrodes,
   wherein said moving element is constrained to move along at least an axis and is able to be latched in at least one of its extreme position along the axis due to electrostatic attraction to at least one of said upper and bottom electrodes, said electrostatic attraction originating from at least a difference of said voltages applied to said moving element and at least one of said upper and bottom electrodes,
   wherein said controlling unit is configured to:
      control the actuation of the plurality of pressure-pulse producing elements, thereby allowing the array of pressure-pulse producing elements to produce:
         a plurality of short time pressure peaks,
            wherein each short time pressure peak is synchronized by said time clock and has an amplitude depending on a number of the pressure-pulse producing elements actuated in unison,
            wherein said plurality of said short time pressure peaks has a certain periodicity which is determined by said time clock and which is at least commeasurable with said short time and at most corresponding to an ultrasonic frequency,
         thereby allowing the array of pressure-pulse producing elements to produce said plurality of short time pressure peaks which are characterized by said ultrasonic frequency and by an amplitude envelope over time such that an oscillation of the amplitude envelope corresponding to audible sound,
         thereby resulting in that said plurality of short time pressure peaks are manifested as an acoustic wave having:
            an ultrasonic component characterized by said ultrasonic frequency, and
            an audible sound component characterized by said amplitude envelope oscillation;
      and
      control the actuation of the plurality of pressure-pulse producing elements so as to control at least a spatial distribution of the pressure peaks over time to form a beam of said acoustic waves focused in a certain region in space, thereby allowing a common control of directivity of said beam composed of said ultrasonic component and said audible sound component, both produced by the plurality of pressure peaks,
   at least a sensor configured to detect at least a portion of said ultrasonic component reflected from at least one object located in said certain region in space, thereby allowing determination of data representative of at least a presence of said at least one object located in said certain region in space.

2. The system of claim 1, wherein said at least sensor and the digital sound reconstruction speaker apparatus are located in the same package.

3. The system of claim 1, wherein the controlling unit is configured to control the actuation of the plurality of pressure-pulse producing elements so as to produce at least an ultrasonic beam whose direction and/or shape varies in time, in order to scan at least part of space.

4. The system of claim 1, wherein the controlling unit is configured to determine at least one of:
   the dimensions, the distance, the form, the direction, data representing the motion, and sound reflecting properties of at least part of the object based at least on the sensing of the said portion of said ultrasonic component reflected by said at least one object.

5. The system of claim 1, further configured to code the ultrasonic component of said beam emitted towards space.

6. The system of claim 1, comprising a plurality of sound digital sound reconstruction speaker apparatus.

7. A camera comprising the sound and detection system of claim 1, said camera comprising a display representing objects detected in the space by said sound and detection system.

8. An audio sound system comprising the sound and detection system of claim 1, wherein the audio sound system is configured to detect at least the position of at least part of an object present in a space surrounding said audio sound system, for controlling the audible content produced by said audio sound system.

9. The audio sound system according to claim 8, wherein the controlling of the audible content comprises the controlling of the directivity of the audible content produced by the at least digital sound reconstruction speaker reconstruction apparatus.

10. The sound and detection system of claim 1, configured to control the directivity of the audible sound component towards said one or more objects based on said data, thereby providing an interactive sound and detection system.

11. A method comprising, by a controlling unit:
controlling the actuation of an array of a plurality of pressure-pulse producing elements of at least a digital sound reconstruction speaker apparatus, wherein each pressure-pulse producing element comprises at least a moving element, an upper electrode and a bottom electrode,
controlling a time clock and voltages applied to said moving element and said upper and bottom electrodes,
wherein said moving element is constrained to move along at least an axis and is able to be latched in at least one of its extreme position along the axis due to electrostatic attraction to at least one of said upper and bottom electrodes, said electrostatic attraction originating from at least a difference of said voltages applied to said moving element and at least one of said upper and bottom electrodes,
wherein the controlling of the actuation of the plurality of pressure-pulse producing elements allows the array of pressure-pulse producing elements to produce:
a plurality of short time pressure peaks,
wherein each short time pressure peak is synchronized by said time clock and has an amplitude depending on a number of the pressure-pulse producing elements actuated in unison,
wherein said plurality of said short time pressure peaks has a certain periodicity which is determined by said time clock and which is at least commeasurable with said short time and at most corresponding to an ultrasonic frequency,
thereby allowing for the array of pressure-pulse producing elements to produce said plurality of short time pressure peaks which are characterized by said ultrasonic frequency and by an amplitude envelope over time such that an oscillation of the amplitude envelope corresponding to audible sound,
thereby resulting in that said plurality of short time pressure peaks are manifested as an acoustic wave having:
an ultrasonic component characterized by said ultrasonic frequency, and
an audible sound component characterized by said amplitude envelope oscillation;
and
controlling the actuation of the plurality of pressure-pulse producing elements so as to control at least a spatial distribution of the pressure peaks over time to form a beam of said acoustic waves focused in a certain region in space, thereby allowing a common control of directivity of said beam composed of said ultrasonic component and said audible sound component, both produced by the plurality of pressure peaks,
sensing at least a portion of said ultrasonic component reflected from at least one object located in said certain region in space, thereby allowing determination of data representative of at least a presence of said at least one object located in said certain region in space.

12. The method of claim 11, further comprising determining at least one of the dimensions, the distance, the form, the direction, data representing the motion and sound reflecting properties of at least part of the object based at least on the sensing of the said reflected portion of the ultrasonic component.

13. The method of claim 11, further comprising coding the ultrasonic component of said beam sent towards space.

14. The method of claim 11, comprising controlling the audible content produced by the at least digital sound reconstruction speaker reconstruction apparatus based at least on the detection of at least the position of at least part of an object present in a space surrounding said at least digital sound reconstruction speaker apparatus.

15. The method of claim 11, configured to control the directivity of the audible sound component towards said one or more objects based on said data, thereby providing an interactive sound and detection system.

16. The method of claim 11, comprising controlling the actuation of the plurality of pressure-pulse producing elements so as to produce at least an ultrasonic beam whose direction and/or shape varies in time, in order to scan at least part of space.

* * * * *